(12) United States Patent
Abedini et al.

(10) Patent No.: US 11,374,671 B2
(45) Date of Patent: Jun. 28, 2022

(54) PHYSICAL CELL IDENTIFIER (PCI) SELECTION BASED ON PRIMARY SYNCHRONIZATION SIGNAL (PSS) WAVEFORM

(71) Applicant: QUALCOMM Incorporated, San Diego, CA (US)

(72) Inventors: Navid Abedini, Somerset, NJ (US); Jianghong Luo, Skillman, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/985,102

(22) Filed: Aug. 4, 2020

(65) Prior Publication Data
US 2021/0044370 A1 Feb. 11, 2021

Related U.S. Application Data

(60) Provisional application No. 62/885,145, filed on Aug. 9, 2019.

(51) Int. Cl.
*H04J 11/00* (2006.01)
*H04W 16/32* (2009.01)
(Continued)

(52) U.S. Cl.
CPC ......... *H04J 11/005* (2013.01); *H04J 11/0073* (2013.01); *H04L 61/3005* (2013.01); *H04W 16/32* (2013.01); *H04W 88/085* (2013.01)

(58) Field of Classification Search
CPC .. H04J 11/005; H04J 11/0073; H04J 11/0079; H04W 16/32; H04W 88/085;
(Continued)

(56) References Cited

U.S. PATENT DOCUMENTS

2009/0047956 A1* 2/2009 Moe ................. H04W 24/02
455/436
2012/0009957 A1* 1/2012 Murasawa ............ H04W 8/26
455/507
(Continued)

FOREIGN PATENT DOCUMENTS

EP 2549825 A1 1/2013
WO WO-2016045337 A1 * 3/2016 ............ H04W 16/02
(Continued)

OTHER PUBLICATIONS

International Search Report and Written Opinion—PCT/US2020/044999—ISAEPO—dated Oct. 5, 2020.

*Primary Examiner* — Mohamed A Kamara
(74) *Attorney, Agent, or Firm* — Loza & Loza, LLP

(57) ABSTRACT

Aspects relate to a physical cell identifier (PCI) change within a wireless network based on a primary synchronization signal (PSS) waveform. A scheduling entity, such as an integrated-access-backhaul (IAB) node within a radio access network (RAN), may communicate with a set of one or more scheduled entities, such as other IAB nodes and/or user equipment (UEs), utilizing a first PCI. The scheduling entity may then change from the first PCI to a second PCI, where the second PCI corresponds to a different PSS waveform than the first PCI. In some examples, the scheduling entity may change the PCI as a result of a PCI collision and/or PSS collision with a neighboring scheduling entity.

30 Claims, 14 Drawing Sheets

(51) Int. Cl.
*H04L 61/30* (2022.01)
*H04W 88/08* (2009.01)
(58) Field of Classification Search
CPC ... H04W 16/10; H04W 74/04; H04W 84/042; H04W 56/00
See application file for complete search history.

(56) References Cited

U.S. PATENT DOCUMENTS

| 2014/0071891 | A1* | 3/2014 | Zhou | H04B 1/7083 |
| | | | | 370/328 |
| 2016/0105860 | A1* | 4/2016 | Li | H04W 74/0833 |
| | | | | 370/350 |
| 2020/0313835 | A1* | 10/2020 | Ji | H04L 5/023 |

FOREIGN PATENT DOCUMENTS

| WO | 2016154604 A1 | 9/2016 | | |
| WO | WO-2019245547 A1 * | 12/2019 | ............ | H04W 40/24 |

* cited by examiner

PHYSICAL CELL IDENTIFIER (PCI) SELECTION BASED ON PRIMARY SYNCHRONIZATION SIGNAL (PSS) WAVEFORM

CROSS-REFERENCE TO RELATED APPLICATIONS

The present Application for Patent claims priority to and the benefit of U.S. Provisional Application No. 62/885,145, titled "PHYSICAL CELL IDENTIFIER (PCI) SELECTION BASED ON PRIMARY SYNCHRONIZATION SIGNAL (PSS) WAVEFORM" filed Aug. 9, 2019, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to techniques for selecting a new physical cell identifier (PCI) for a cell within a wireless network.

Introduction

In wireless networks, a cell may be identified by a physical cell identifier (PCI). The PCI may be carried in a primary synchronization signal (PSS) and secondary synchronization signal (SSS) of a synchronization signal block (SSB). In addition, the PCI may be used to determine scrambling sequences of various physical signals or channels, such as the physical broadcast channel (PBCH), physical downlink control channel (PDCCH) CoreSet0, and cell-specific physical downlink shared channel (PDSCH) transmissions.

In some networks, two neighboring cells may be assigned the same PCI, which may result in a PCI collision. For example, in Integrated-Access-Backhaul (IAB) networks that utilize wireless spectrum for both access links (links to user equipment (UEs)) and backhaul links (links to the core network), neighboring IAB nodes (e.g., base stations) may be assigned the same PCI as a result of mobile IAB nodes or zero-network planning. When two neighboring cells have the same PCI, a UE may not be able to differentiate reference signals from each of the neighboring cells. In addition, a PCI collision between two neighboring cells may lead to timing synchronization and channel estimation issues at the UE, and may further result in decoding failure of user data traffic transmitted from one of the two neighboring cells.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the present disclosure relate to facilitating a PCI change within a wireless network based on a primary synchronization signal (PSS) waveform. A scheduling entity, such as a base station or IAB node, may communicate with a set of one or more scheduled entities, such as UEs or other IAB nodes, utilizing a first PCI. The scheduling entity may then change from the first PCI to a second PCI, where the second PCI corresponds to a different PSS waveform than the first PCI. The scheduling entity may change the PCI as a result of a PCI collision and/or PSS collision with a neighboring scheduling entity.

In some examples, the scheduling entity may autonomously initiate the PCI change upon discovering a PCI and/or PSS collision with a neighboring scheduling entity. In other examples, the scheduling entity may receive a message from a network node indicating the scheduling entity should perform the PCI change upon the network node discovering a PCI and/or PSS collision with the neighboring scheduling entity. For example, the network node may include a centralized network node, such as another IAB node or other central network entity.

In one example, a method of wireless communication at a first scheduling entity is disclosed. The method includes communicating with a set of one or more scheduled entities utilizing a first physical cell identifier (PCI), and changing from the first PCI to a second PCI to communicate with the set of one or more scheduled entities. The first PCI can correspond to a first primary synchronization signal (PSS) waveform and the second PCI can correspond to a second PSS waveform different than the first PSS waveform.

Another example provides a first scheduling entity within a wireless communication network including a transceiver configured to communicate with a set of one or more scheduled entities in the wireless communication network, a memory, and a processor communicatively coupled to the transceiver and the memory. The processor and the memory can be configured to communicate with the set of one or more scheduled entities utilizing a first physical cell identifier (PCI), and change from the first PCI to a second PCI to communicate with the set of one or more scheduled entities. The first PCI can correspond to a first primary synchronization signal (PSS) waveform and the second PCI can correspond to a second PSS waveform different than the first PSS waveform.

In another example, a method of wireless communication at a centralized network node is disclosed. The method includes detecting a collision between a first primary synchronization signal (PSS) waveform corresponding to a first physical cell identifier (PCI) assigned to a first scheduling entity and a second PSS waveform corresponding to a second PCI assigned to a second scheduling entity located proximate to the first scheduling entity. The method further includes selecting a third PCI for the first scheduling entity. The third PCI can correspond to a third PSS waveform different than the first PSS waveform to avoid colliding with the second PSS waveform. The method further includes transmitting a PCI change indication including the third PCI to the first scheduling entity to initiate a change from the first PCI to the third PCI within the first scheduling entity.

Another example provides a centralized network node within a wireless communication network including a transceiver, a memory, and a processor communicatively coupled to the transceiver and the memory. The processor and the memory can be configured to detect a collision between a first primary synchronization signal (PSS) waveform corresponding to a first physical cell identifier (PCI) assigned to a first scheduling entity and a second PSS waveform corresponding to a second PCI assigned to a second scheduling entity located proximate to the first scheduling entity. The processor and the memory can further be configured to select a third PCI for the first scheduling entity. The third PCI can correspond to a third PSS waveform different than the first PSS waveform to avoid colliding with the second PSS waveform. The processor and the memory can further be configured to transmit a PCI change indication including the third PCI to the first scheduling entity to initiate a change from the first PCI to the third PCI within the first scheduling entity.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
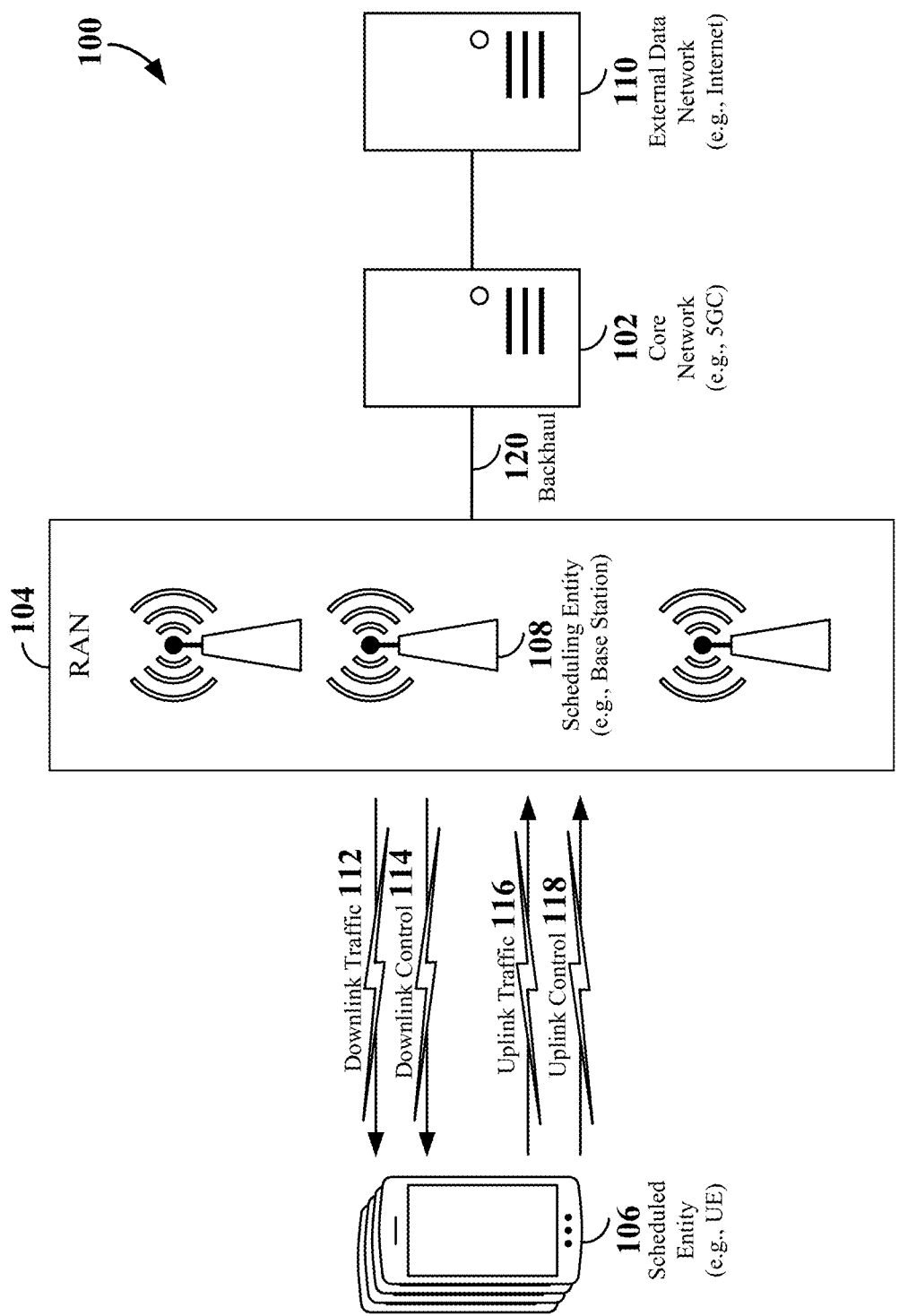
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
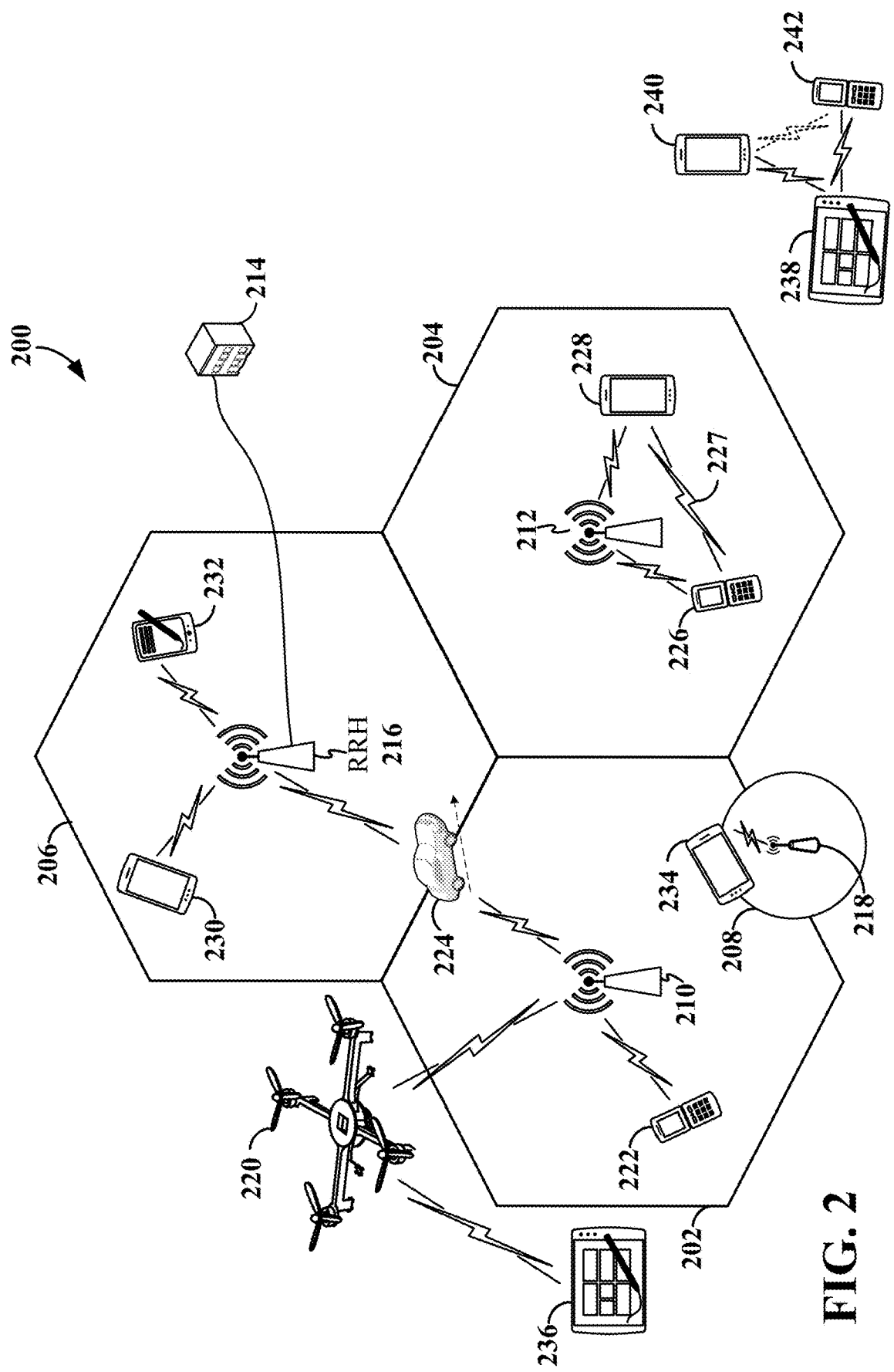
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell.

Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 42 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target)

cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
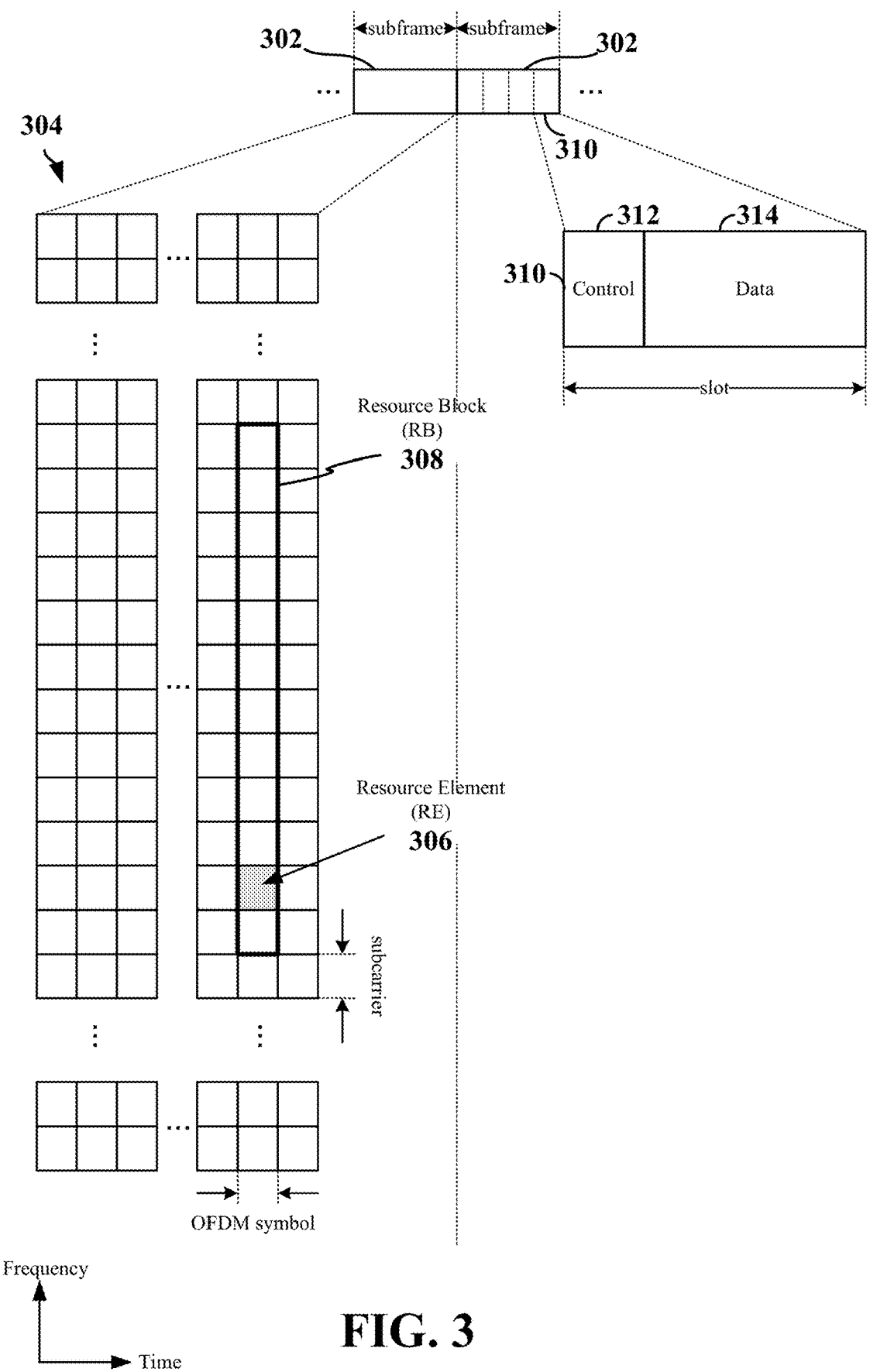
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port.

That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformation-Type1 (SIB1) that may include various additional system information. Examples of system information may include, but are not limited to, subcarrier spacing, system frame number, cell bar indication, a list of common control resource sets (CoreSets) (e.g., PDCCH CoreSet0 or CoreSet1), a list of common search spaces, a search space for SIB1, a paging search space, a random access search space, and uplink configuration information.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
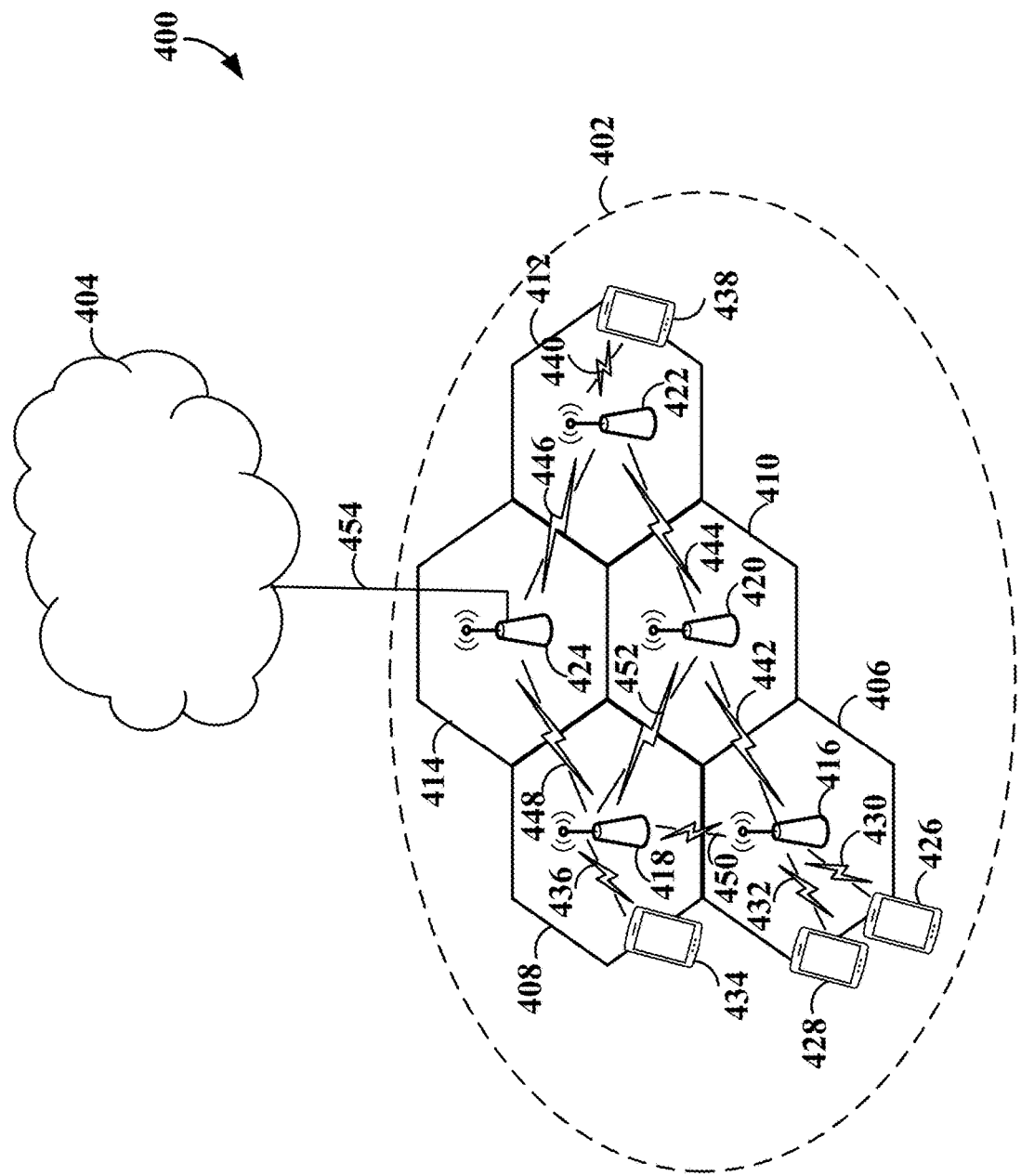
FIG. 4 is a diagram providing a high-level illustration of one example of a network configuration including an Integrated-Access-Backhaul (IAB) network according to some aspects.

FIG. 4 is a schematic diagram providing a high-level illustration of one example of an Integrated-Access-Backhaul (IAB) network configuration 400 that may be utilized in some aspects of the disclosure. In this illustration, a communication network 402, such as an IAB network, is coupled to a remote network 404, such as a main backhaul network or mobile core network. In such an IAB network 402, the wireless spectrum may be used for both access links and backhaul links.

The IAB network 402 may be similar to the radio access network 200 shown in FIG. 2, in that the IAB network 402 may be divided into a number cells 406, 408, 410, 412, and 414, each of which may be served by a respective IAB node 416, 418, 420, 422, and 424. Each of the IAB nodes 416-424 may be an access point, base station (BS), eNB, gNB, or other node that utilizes wireless spectrum (e.g., the radio frequency (RF) spectrum) to support access for one or more UEs located within the cells 406-414 served by the IAB nodes. Each cell 406, 408, 410, 412, and 414 is assigned a respective physical cell identifier (PCI), which is used to identify the respective cell in the IAB network 402. In 4G (New Radio) systems, there are 1008 supported values for the PCI. The PCI may be reused by multiple geographically separated cells in the IAB network 402. In this example, cells with the same PCI may be distinguished by their unique cell global identifier (NCGI).

In the example shown in FIG. 4, IAB node 416 communicates with UEs 426 and 428 via wireless access links 430 and 432, IAB node 418 communicates with UE 434 via wireless access link 436, and IAB node 422 communicates with UE 438 via wireless access link 440. The IAB nodes 416-424 are further interconnected via one or more wireless backhaul links 442, 444, 446, 448, 450, and 452. Each of the wireless backhaul links 442-452 may utilize the same wireless spectrum (e.g., the radio frequency (RF) spectrum) as the access links 430-440 to backhaul access traffic to/from the remote network 404. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 402.

In the example shown in FIG. 4, IAB node 416 communicates with IAB node 420 via wireless backhaul link 442, IAB node 420 communicates with IAB node 422 via wireless backhaul link 444, IAB node 422 communicates with IAB node 424 via wireless backhaul link 446, IAB node 424 communicates with IAB node 418 via wireless backhaul link 448, IAB node 418 communicates with IAB node 416 via wireless backhaul link 450, and IAB node 418 communicates with IAB node 420 via wireless backhaul link 452. As shown in FIG. 4, each IAB node 416-424 may be connected via respective wireless backhaul links 442-452 to two or more other IAB nodes for robustness.

Some or all of the IAB nodes 416-424 may also be connected via wired backhaul links (e.g., fiber, coaxial cable, Ethernet, copper wires, etc.) and/or microwave backhaul links. Thus, the IAB network 402 may support both wired/microwave and wireless backhaul traffic. At least one of the IAB nodes (e.g., IAB node 424 may be a border IAB node that also provides a communication link 454 to the remote network 404. For example, the border IAB node 424 may include a wired (e.g., fiber, coaxial cable, Ethernet, copper wires), microwave, or other suitable link 454 to the remote network 404.

To facilitate wireless communication between the IAB nodes 416-424 and between the IAB nodes 416-424 and the UEs served by the IAB nodes 416-424, each IAB node 416-424 may be configured to operate as both a scheduling entity and a scheduled entity. Thus, an IAB node (e.g., IAB node 416) may utilize the same wireless spectrum (e.g., the radio frequency (RF) spectrum) to transmit access traffic to/from UEs and to then backhaul that access traffic to/from the remote network 404. For example, to backhaul access traffic to/from IAB node 418, IAB node 418 may communicate with IAB node 420 to transmit backhaul access traffic via wireless backhaul link 452, IAB node 420 may communicate with IAB node 422 to transmit the backhaul access traffic via wireless backhaul link 444, and IAB node 422 may communicate with IAB node 424 to transmit the backhaul access traffic via wireless backhaul link 446. In this example, IAB nodes 420 and 422 may each operate as both a scheduling entity and a scheduled entity to backhaul access traffic to/from IAB node 416. As such, communication between a pair of IAB nodes may be individually scheduled by one of the IAB nodes within the pair.

In other examples, an IAB node may schedule wireless backhaul communications between other pairs of IAB nodes. For example, IAB node 424 may operate as the scheduling entity for the IAB network 402, while IAB nodes 416, 420, and 422 each operate as a scheduled entity to backhaul access traffic to/from IAB node 416. In this example, IAB node 424 may schedule wireless backhaul communications between each of the pairs of IAB nodes (e.g., between IAB node 416 and IAB node 420, between IAB node 420 and IAB node 422, and between IAB node 422 and IAB node 424). As another example, IAB node 422 may operate as a scheduling entity to schedule wireless backhaul communications between IAB nodes 416 and 420 and also between IAB node 420 and IAB node 422. IAB node 422 may then operate as a scheduled entity to allow IAB node 424 to schedule wireless backhaul communications therebetween.

Figure 5:
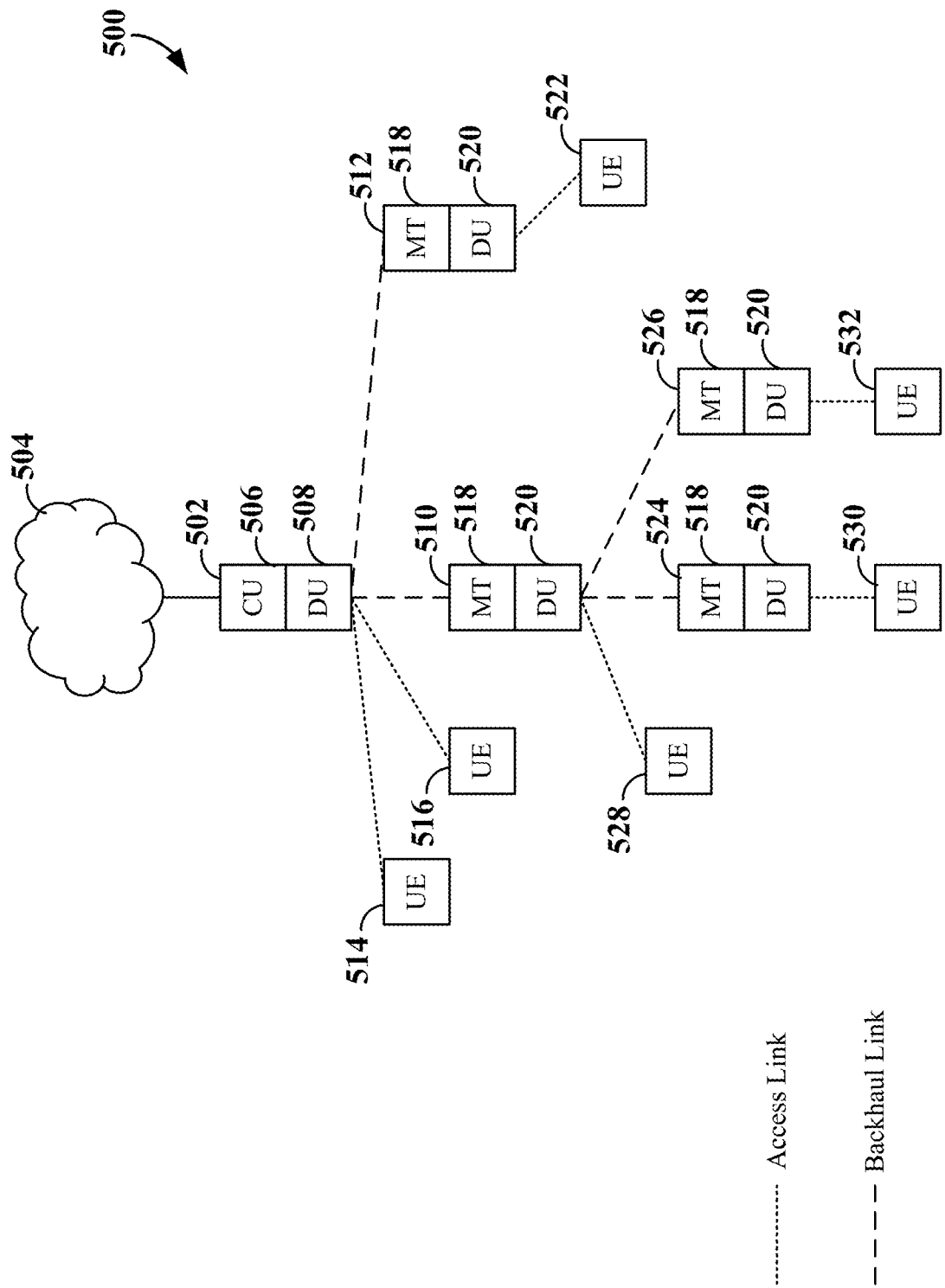
FIG. 5 is a diagram illustrating an example of IAB node functionality within an IAB network according to some aspects.

FIG. 5 is a schematic diagram illustrating an example of IAB node functionality within an IAB network 500. In the example shown in FIG. 5, an IAB node 502 is shown coupled to a core network 504 via a wireline connection. This IAB node 502 may be referred to herein as an IAB donor node, which may be, for example, an enhanced gNB including functionality for controlling the IAB network 500. In some examples, the IAB donor node 502 may include a central unit (CU) 506 and a distributed unit (DU) 508. The CU 506 is configured to operate as a centralized network node (or central entity) within the IAB network 500. For example, the CU 506 may include radio resource control (RRC) layer functionality and packet data convergence protocol (PDCP) layer functionality to control/configure the other nodes (e.g., IAB nodes and UEs) within the IAB network 500.

The DU 508 is configured to operate as a scheduling entity to schedule scheduled entities (e.g., other IAB nodes and UEs) of the IAB donor node 502. For example, the DU 508 of the IAB donor node 502 may operate as a scheduling entity to schedule IAB nodes 510 and 512 and UEs 514 and 516. Thus, the DU 508 of the IAB donor node 502 may schedule communication with IAB nodes 510 and 512 via respective backhaul links and schedule communication with UEs 514 and 516 via respective access links. In some examples, the DU 508 may include the radio link control (RLC), medium access control (MAC), and physical (PHY) layer functionality to enable operation as a scheduling entity.

Each of the IAB nodes 510 and 512 may be configured as a Layer 2 (L2) relay node including a respective DU 520 and a mobile termination (MT) unit 518 to enable each L2 relay IAB node 510 and 512 to operate as a scheduling entity and a scheduled entity. For example, the MT unit 518 within each of the L2 relay IAB nodes 510 and 512 is configured to operate as a scheduled entity that may be scheduled by the IAB donor node 502. Each MT unit 518 within the L2 relay IAB nodes 510 and 512 further facilitates communication with the IAB donor node 502 via respective backhaul links. In addition, the DU 520 within each of the L2 relay IAB nodes 510 and 512 operates similar to the DU 508 within the IAB donor node 502 to function as a scheduling entity to schedule one or more respective scheduled entities (e.g., other IAB nodes and/or UEs) of the L2 relay IAB nodes 510 and 512.

For example, the DU 520 of L2 relay IAB node 512 functions as a scheduling entity to schedule communication with a UE 522 via an access link, while the DU 520 of L2 relay IAB node 510 functions as a scheduling entity to schedule communication with the MT units 518 of L2 relay IAB nodes 524 and 526 via respective backhaul links and a UE 528 via an access link. Each of the L2 relay IAB nodes 524 and 526 further includes a respective DU 520 that functions as a scheduling entity to communicate with respective UEs 530 and 532. Thus, in the network topology illustrated in FIG. 5, since IAB donor node 502 is configured to control each of the other nodes in the IAB network, the IAB donor node 502 is a parent IAB node of child IAB nodes 510, 512, 524 and 526. In addition, IAB node 510 is further a parent IAB node of child IAB nodes 524 and 526. For example, the CU 506 and DU 508 within IAB donor node 502 may function as the parent IAB node of child IAB nodes 510, 512, 524, and 526 and the DU 520 within IAB node 510 may function as the parent IAB node of child IAB nodes 524 and 526. The MT unit 518 within IAB nodes 510, 512, 524, and 526 may further function as child IAB nodes.

In a mobile IAB network, one or more of the L2 relay IAB nodes 510, 512, 524, and/or 526 may be moving within the IAB network 500. For example, an L2 relay IAB node (e.g., IAB node 524) may be a mobile IAB node installed on a bus, train, taxi, or other moveable object. As the mobile IAB node 524 moves through the IAB network 500, the parent IAB node of the mobile IAB node 524 may change through a topology adaptation procedure. However, as the mobile IAB node 524 moves through the IAB network 500, a PCI collision may occur between the mobile IAB node 524 and another stationary or mobile L2 relay IAB node serving a cell assigned the same PCI. In addition, a PCI collision may also occur in a fixed IAB network 500 that utilizes zero-network planning (e.g., for an over-deployed network in which gNBs are added in an ad-hoc manner).

When two neighboring cells are assigned the same PCI, a scheduled entity (e.g., a UE or child IAB node) may not be able to differentiate reference signals from each of the neighboring cells, since the reference signals are scrambled based on the same PCI. In addition, a PCI collision between two neighboring cells may lead to timing synchronization and channel estimation issues at the UE, and may result in decoding failure of user data traffic transmitted from one of the two neighboring cells. Therefore, to mitigate PCI collision issues, the PCI for one of the two neighboring cells may be changed from an old PCI (e.g., the colliding PCI) to a new PCI.

However, even after PCI collision management resulting in two neighboring cells utilizing different PCIs, the two neighboring cells may still transmit the same PSS, resulting in a PSS collision between the neighboring cells. The PSS sand SSS waveforms each depend upon the PCI. However, for the PSS, there are only three waveform options, and the choice of PSS waveform option is a function of the PCI as mod(PCI, 3), For example, the PCI ($N_{ID}^{cell}$) may be defined by the equation:

$$N_{ID}^{cell} = 3N_{ID}^{(1)} + N_{ID}^{(2)} \quad \text{(Equation 1)}$$

where $N_{ID}^{(1)}$ is the SSS whose value is selected from the group $\{0, 1, \ldots, 335\}$ and $N_{ID}^{(2)}$ is the PSS whose value is selected from the group $\{0, 1, 2\}$.

When two neighboring cells have overlapping coverage areas, a scheduled entity (e.g., a UE or child IAB node) within the overlapping coverage area may receive signals (e.g., SSBs) from both cells. If each cell transmits the same PSS waveform, the ability of the scheduled entity to perform a cell search in idle or connected mode may be affected, along with tracking synchronization in the serving cell and beam management and beam tracking in the serving cell.

For example, when two neighboring cells transmit the same PSS and different SSS, the scheduled entity receiving each PSS from each neighboring cell observes a composite PSS channel that is different from the SSS channel. In general, the combined signal received by the scheduled entity from two neighboring cells may be represented as:

$$y = h_1 x_1 + h_2 x_2 + n, \quad \text{(Equation 2)}$$

where $x_1$ and $x_2$ are the respective signals transmitted by each of the neighboring cells, $h_1$ and $h_2$ are the respective channels between the scheduled entity and each of the neighboring cells, and n represents the noise.

When both neighboring cells transmit the same PSS, $x_1=x_2$, and therefore, each PSS may be represented by the variable p in Equation 1, such that:

$$y(PSS)=(h_1+h_2)p+n_1. \quad \text{(Equation 3)}$$

After descrambling (e.g., utilizing the PCI of the serving cell ($PCI_1$)), the channel corresponding to the received PSS is a composite channel, which may be represented by:

$$\hat{y}(PSS) = \frac{py^*}{|p|^2} = (h_1 + h_2) + n_1 \quad \text{(Equation 4)}$$

By contrast, when neighboring cells transmit different SSS that are orthogonal or pseudo-orthogonal (e.g., in the code domain) to one another, $x_1=x_1$ and $x_2=s_2$, and therefore, the combined SSS received at the scheduled entity may be represented as:

$$y(SSS)=h_1s_1+h_2s_2+n_2. \quad \text{(Equation 5)}$$

After descrambling (e.g., utilizing $PCI_1$), the signal $s_2$ may be removed (e.g., as a result of the orthogonality or pseudo-orthogonality of the two signals), and as such, the channel corresponding to the received SSS includes only the channel between the scheduled entity and the serving cell, as shown in the below equation:

$$\hat{y}(SSS) = \frac{s_1 y^*}{|s_1|^2} = h_1 + n_1. \quad \text{(Equation 6)}$$

Thus, when neighboring cells transmit the same PSS waveform, but different SSS waveforms, the receiving scheduled entity may not be able to distinguish between the cells. The PSS collision may occur as a result of a PCI collision and selection of a new PCI that produces the same PSS waveform as a neighboring cell, a mobile IAB node moving into a coverage area of a neighboring cell utilizing the same PSS waveform, or zero-network planning.

Various aspects of the present disclosure are directed to a PCI update mechanism in which a first scheduling entity (e.g., gNB or parent IAB node) utilizing a first (or old) PCI to communicate with a set of one or more scheduled entities may change to using a second (or new) PCI to communicate with the set of one or more scheduled entities, where the first PCI corresponds to a first PSS waveform and the second PCI corresponds to a second PSS waveform different than the first PSS waveform. In some examples, the first scheduling entity may change to using the second PCI upon detecting a collision between the first PCI utilized by the first scheduling entity and a third PCI utilized by a second scheduling entity located proximate to the first scheduling entity, such that the first PCI and the third PCI are identical. Here, a first coverage area of the first scheduling entity may overlap a second coverage area of the second scheduling entity. In other examples, the first scheduling entity may change to using the second PCI upon detecting a collision between the first PSS waveform transmitted by the first scheduling entity and a third PSS waveform transmitted by the second scheduling entity, such that the first PSS waveform and the third PSS waveform are identical. In some examples, the first scheduling entity may change from the first PCI to the second PCI upon receipt of a PCI change indication from a centralized network node. In other examples, the first scheduling entity may autonomously change from the first PCI to the second PCI.

Figure 6:
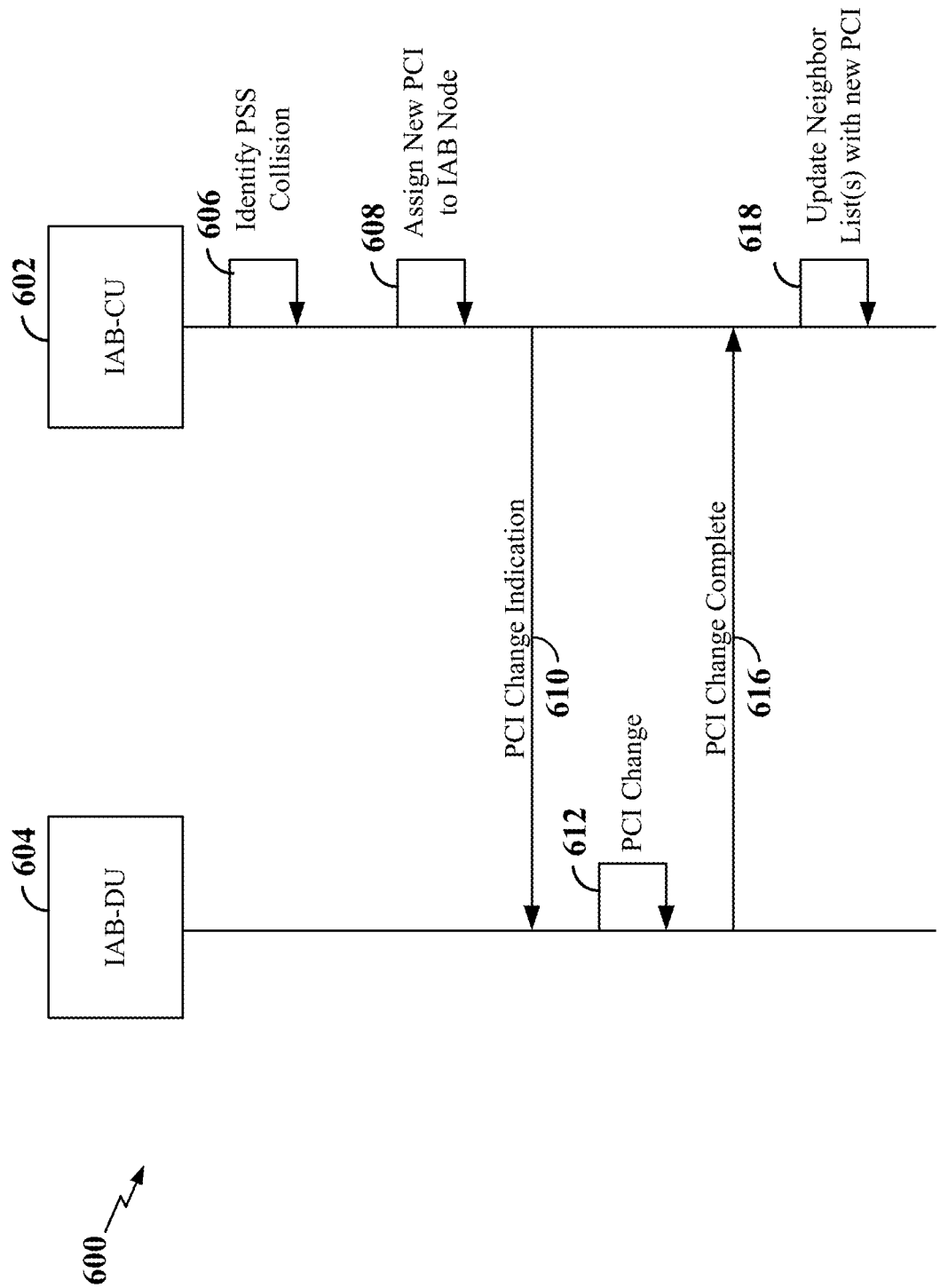
FIG. 6 is a diagram illustrating an example of a PCI change procedure according to some aspects.

FIG. 6 illustrates an example of a PCI change procedure that may be performed, for example, within an IAB network 600. In the example shown in FIG. 6, a centralized network node associated with the IAB network 600 renders the decision on whether to perform the PCI change for the scheduling entity (e.g., an IAB-DU 604, which may be, for example, a DU within an L2 relay IAB node). The centralized network node may be, for example, a network entity configured for PCI management, a base station (e.g., gNB or eNB) with a larger coverage area in the IAB network 600 (e.g., a parent IAB node or other base station with a larger coverage area than the IAB-DU 604), or an IAB-CU 602 (e.g., within an IAB donor node) of the IAB network 600, the latter being illustrated in FIG. 6. As shown in FIG. 6, the centralized network node (e.g., IAB-CU 602) is in communication with the IAB-DU 604 via one or more backhaul links.

At 606, the IAB-CU 602 identifies a PSS collision associated with the IAB-DU 604. For example, the PSS collision may be between the IAB-DU 604 and a neighboring IAB-DU (not shown, for simplicity). Here, the coverage areas of the IAB-DU 604 and neighboring IAB-DU may at least partially overlap. In some examples, the IAB-CU 602 may identify the PSS collision through topology adaptation procedures performed as a result of a mobile IAB node, neighbor list updates provided by L2 relay IAB nodes, and/or information provided by other network nodes (e.g., child IAB nodes and/or UEs). In some examples, the PSS collision may result from a PCI collision between the IAB-DU 604 and the neighboring IAB-DU. In other examples, the PSS collision may result from different PCIs between the IAB-DU 604 and neighboring IAB-DU producing the same PSS waveform. Upon discovering the PSS collision, at 608, the IAB-CU 602 assigns a new PCI to the IAB-DU 604. The new PCI is selected to produce a different PSS waveform than the PCI assigned to the neighboring IAB-DU. At 610, the IAB-CU 602 then transmits a message (e.g., an RRC message) including a PCI change indication with the new PCI to the IAB-DU 604. In some examples, the message including the PCI change indication may be a signal defined at the F1-AP interface between the IAB-CU 602 and the IAB-DU 604.

At 612, the IAB-DU 604 changes to using the new PCI to identify a cell served by the IAB-DU 604 and generate PSS/SSS waveforms. At 616, the IAB-DU 604 may transmit a message including a PCI change complete indication to the IAB-CU 602 after completing the change to the new PCI. At 618, the IAB-CU 602 may update one or more neighbor lists with the new PCI and provide the updated neighbor lists to neighboring IAB nodes of the IAB-DU 604. In examples in which a centralized network node other than the IAB-CU 602 decides to perform the PCI change, the centralized network node may transmit a signal indicating the PCI change to the IAB-DU 604 and may further transmit another signal indicating the PCI change to the IAB-CU 602 to enable the IAB-CU 602 to update the neighbor list(s) with the new PCI of the IAB-DU 604. In some examples, the IAB-CU 602 may further coordinate with neighbor IAB nodes (e.g., gNBs and/or eNBs) of the IAB-DU 604 via an Xn/X2 interface to update a mapping between the new PCI and the NCGI associated with the IAB-DU 604.

Figure 7:
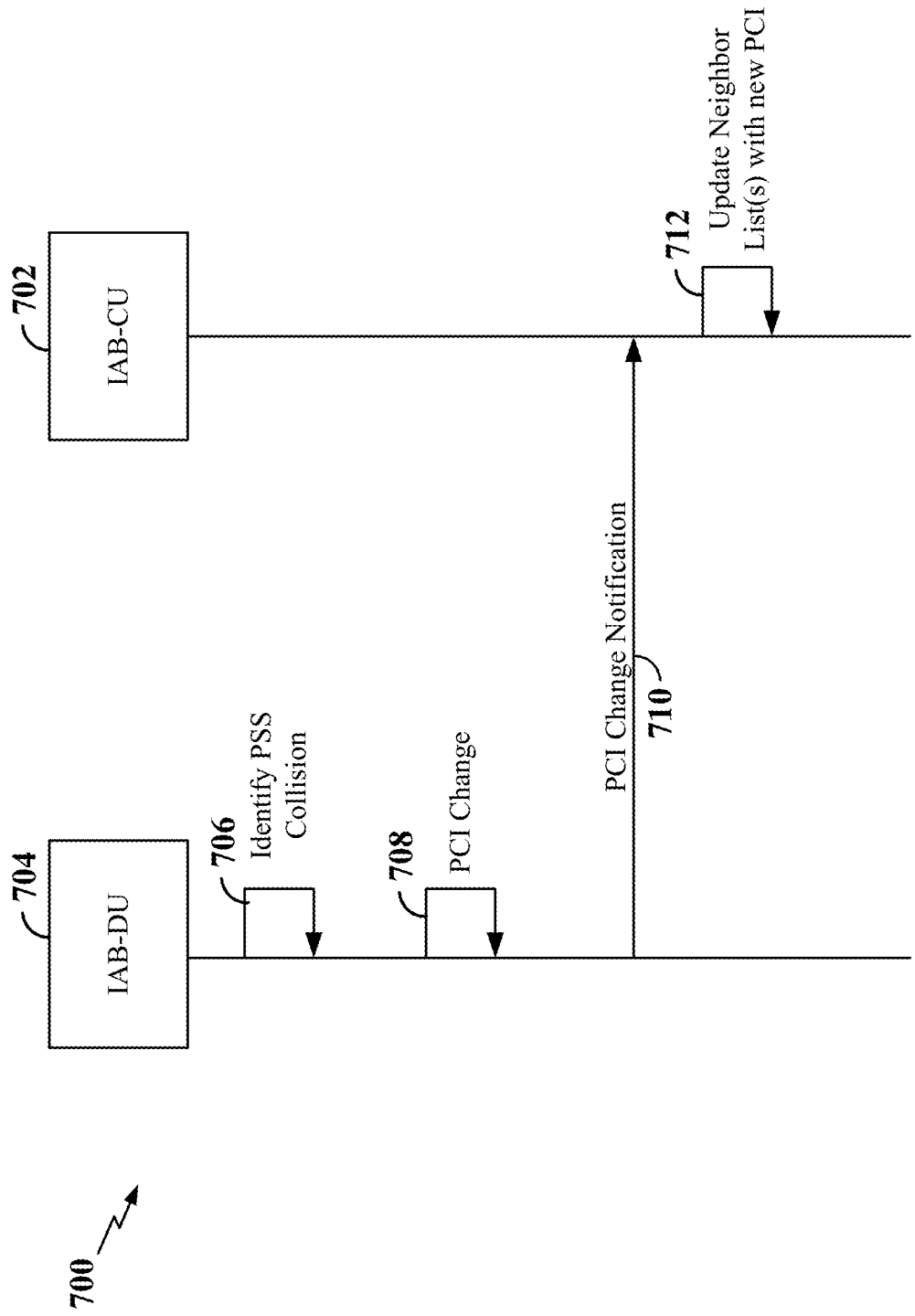
FIG. 7 is a diagram illustrating another example of a PCI change procedure according to some aspects.

FIG. 7 is a diagram illustrating another example of a soft PCI change procedure that may be performed, for example, within an IAB network 700. In the example shown in FIG. 7, an IAB-DU 704 (e.g., a DU within an L2 relay IAB node) may autonomously decide to initiate the PCI change and may communicate the PCI change decision to an IAB-CU 702 (e.g., a CU within an IAB donor node). In this example, the IAB-DU 704 may be within an RRC-enhanced IAB node that is capable of implementing at least part of the RRC functionality.

At 706, the IA-DU 704 identifies a PSS collision associated with the IAB-DU 704. For example, the PSS collision may be between the IAB-DU 704 and a neighboring IAB-DU (not shown, for simplicity). Here, the coverage areas of the IAB-DU 704 and the neighboring IAB-DU may at least partially overlap. In some examples, the IAB-DU 704 may identify the PSS collision through neighbor list updates, neighbor cell searches (e.g., inter-IAB node discovery), or information provided by a scheduled entity or other network node. For example, a scheduled entity may identify the PSS collision upon receiving and processing PSS/SSS from both the IAB-DU 704 and the neighboring IAB-DU. As another example, a parent IAB-node of the IAB-DU 704 or other IAB node in the IAB network 700 may discover the PSS collision through network topology adaptation procedures, neighbor list updates, neighbor cell searches, and/or other information provided by other nodes in the IAB network 700.

In some examples, the PSS collision may result from a PCI collision between the IAB-DU 704 and the neighboring IAB-DU. In other examples, the PSS collision may result from different PCIs between the IAB-DU 704 and neighboring IAB-DU producing the same PSS waveform. Upon discovering the PSS collision, at 708, the IAB-DU 704 may select a new PCI to produce a different PSS waveform than the PCI assigned to the neighboring IAB-DU. At 710, the IAB-DU 704 transmits a message including a PCI change notification to the IAB-CU 702. In other examples, the IAB-DU 704 may transmit a request for a PCI change to the IAB-CU 702, which may then assign the new PCI to the IAB-DU 704. At 712, the IAB-CU 702 may update one or more neighbor lists with the new PCI and provide the updated neighbor lists to neighboring IAB nodes of the IAB-DU 704.

Figure 8:
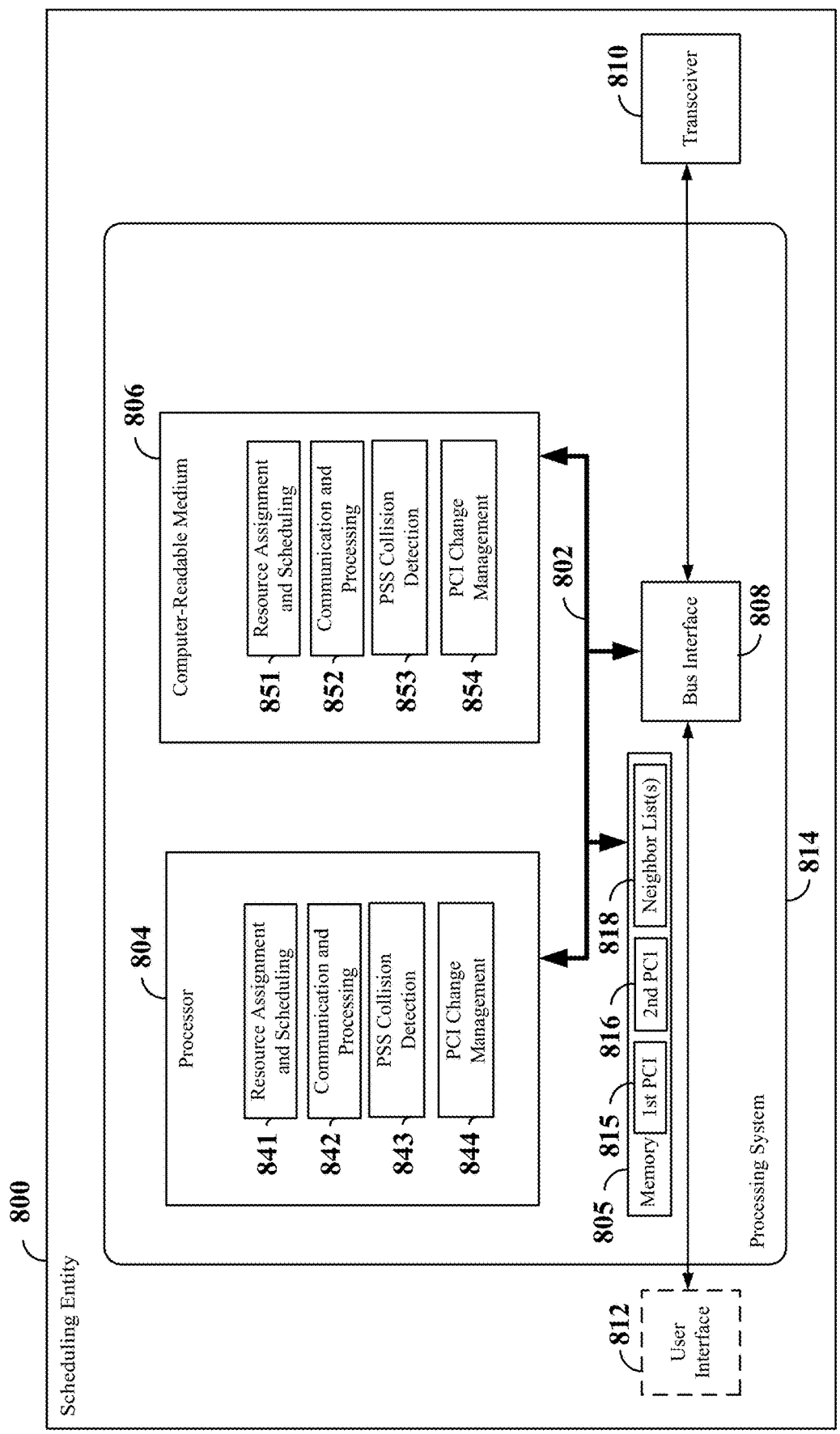
FIG. 8 is a block diagram illustrating an example of a hardware implementation for a scheduling entity employing a processing system according to some aspects.

FIG. 8 is a block diagram illustrating an example of a hardware implementation for a scheduling entity 800 employing a processing system 814. For example, the scheduling entity 800 may be a base station (e.g., eNB, gNB), IAB donor node (e.g., DU of an IAB donor node), L2 relay IAB node (e.g., DU of an L2 relay donor node), or other scheduling entity as illustrated in any one or more of FIGS. 1, 2, and/or 4-7.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium (e.g., air). Depending upon the nature of the apparatus, a user interface 812 (e.g., keypad, display, speaker, microphone, joystick, touchscreen) may also be provided. Of course, such a user interface 812 is optional, and may be omitted in some examples.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include resource assignment and scheduling circuitry 841, configured to generate, schedule, and modify a resource assignment or grant of time-frequency resources (e.g., a set of one or more resource elements) in one or more beam directions. For example, the resource assignment and scheduling circuitry 841 may schedule time-frequency resources within a plurality of time division duplex (TDD) and/or frequency division duplex (FDD) slots to carry user data traffic and/or control information to and/or from a set of one or more scheduled entities (e.g., UEs or child IAB nodes). Thus, the resource assignment and scheduling circuitry 841 may be configured within a DU of an IAB donor node or L2 relay IAB node In some examples, the resource assignment and scheduling circuitry 841 may be configured to schedule an SSB including a PSS and SSS carrying the PCI of a cell served by the scheduling entity 800. In examples in which the scheduling entity 800 is an L2 relay IAB node that autonomously determines to initiate a PCI change from a first PCI 815 to a second PCI 816, the resource assignment and scheduling circuitry 841 may be configured to schedule transmission of a message including a PCI change notification (or PCI change request) to a centralized network node, such as an IAB donor node (e.g., IAB-CU), within the IAB network. The first PCI 815 and second PCI 816 may be stored, for example, in memory 805. The resource assignment and scheduling circuitry 841 may further be configured to execute resource assignment and scheduling software 851 included on the computer-readable medium 806 to implement one or more functions described herein.

The processor 804 may further include communication and processing circuitry 842, configured to communicate with a set of one or more scheduled entities (e.g., UEs or child IAB nodes). In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 842 may be configured to generate and transmit an SSB including a PSS and SSS carrying the PCI of the cell served by the scheduling entity 800.

In examples in which the scheduling entity 800 is an L2 relay IAB node, the communication and processing circuitry 842 may be configured to receive a message (e.g., RRC signal) including a PCI change indication from a centralized network node (e.g., an IAB donor node, such as an IAB-CU) to initiate the PCI change from the first PCI 815 to the second PCI 816. The communication and processing circuitry 842 may further be configured to store the second PCI 816 included within the PCI change indication within memory 805. In examples in which the scheduling entity 800 is an L2 relay IAB node that autonomously initiates a PCI change, the communication and processing circuitry 842 may be configured to generate and transmit, via the transceiver 810, a PCI change notification including the second PCI 816 (or a PCI change request that requests the second PCI 816) to an IAB donor node within the IAB network. The communication and processing circuitry 842 may further be configured to execute communication and processing software 852 included on the computer-readable medium 806 to implement one or more functions described herein.

The processor 804 may further include PSS collision detection circuitry 843, configured to detect a PSS collision between two neighboring IAB nodes. In some examples, the PSS collision detection circuitry 843 may be configured to detect the PSS collision between the scheduling entity 800 and a neighboring IAB node (e.g., another L2 relay IAB node located proximate to the scheduling entity 800 having a coverage area that may at least partially overlap the coverage area of the scheduling entity 800) through neighbor list 818 updates (e.g., which may be stored, for example, in memory 805), neighbor cell searches (e.g., inter-IAB node discovery), or information provided by a scheduled entity or other network node. For example, a scheduled entity (e.g., UE or child IAB node of the scheduling entity 800) may identify the PSS collision upon receiving and processing PSS/SSS from both the scheduling entity 800 and the neighboring IAB node. As another example, a parent IAB node of the scheduling entity 800 or other IAB node in the IAB network may discover the PSS collision through network topology adaptation procedures, neighbor list 818 updates, neighbor cell searches, and/or other information provided by other nodes in the IAB network. In some examples, the PSS collision may result from a PCI collision between the scheduling entity 800 and the neighboring IAB node. In other examples, the PSS collision may result from different PCIs between the scheduling entity 800 and the neighboring IAB node producing the same PSS waveform. The PSS collision detection circuitry 843 may further be configured to execute PSS collision detection software 853 included on the computer-readable medium 806 to implement one or more functions described herein.

The processor 804 may further include PCI change management circuitry 844, configured to perform a PCI change from the first PCI 815 to the second PCI 816. In examples in which the scheduling entity 800 is an L2 relay IAB node experiencing a PSS collision, the PCI change management circuitry 844 may be configured to receive the message including the PCI change indication with the second PCI 816 from the IAB donor node. In examples in which the scheduling entity 800 is an RRC-enhanced IAB node experiencing a PCI collision, the PCI change management circuitry 844 may be configured to receive an indication of a PSS collision from the PSS collision detection circuitry 843 and operate together with the communication and processing circuitry 842 to generate and transmit a message including either the PCI change notification with the second PCI 816 or the PCI change request (e.g., requesting the second PCI 816) to the IAB donor node in the IAB network. In this example, the PCI change management circuitry 844 may further be configured to receive the message including the PCI change indication with the second PCI 816 from the IAB donor node in response to the PCI change request. The PCI change management circuitry 844 may further be configured to execute PCI change management software 854 included on the computer-readable medium 806 to implement one or more functions described herein.

Figure 9:
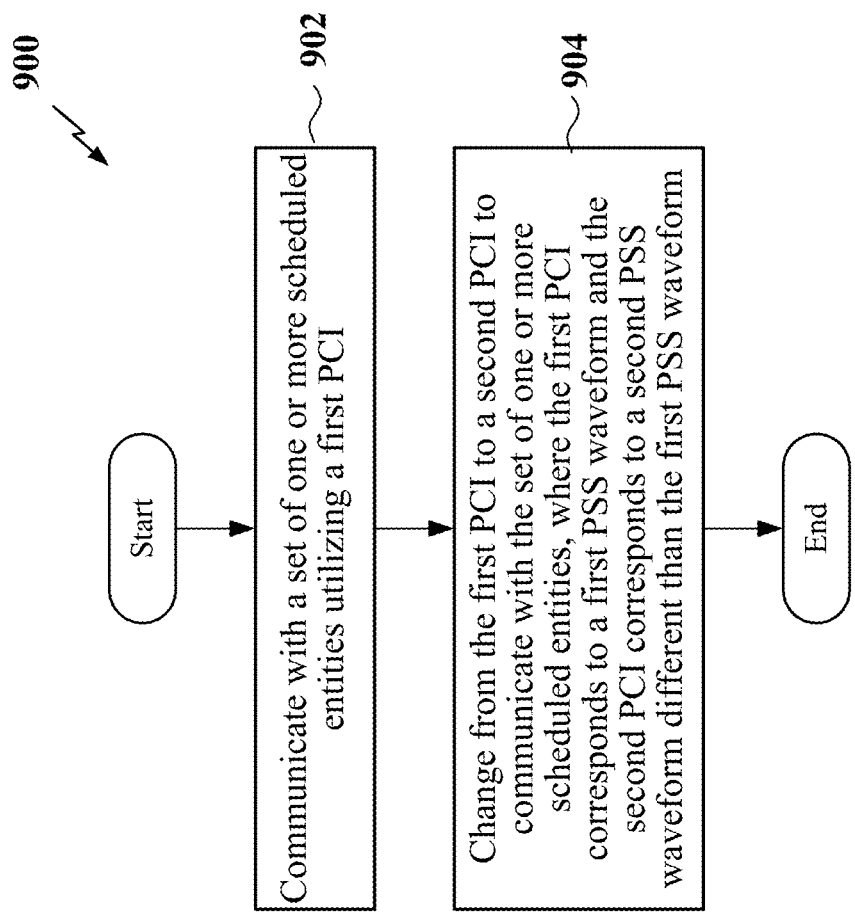
FIG. 9 is a block diagram illustrating an example of a hardware implementation for a centralized network node employing a processing system according to some aspects.

FIG. 9 is a flow chart illustrating an exemplary process 900 for performing a PCI change based on a PSS waveform at a scheduling entity according to some aspects of the disclosure. As described below, some or all illustrated features may be omitted in a particular implementation within the scope of the present disclosure, and some illustrated features may not be required for implementation of all embodiments. In some examples, the process 900 may be carried out by the scheduling entity illustrated in FIG. 8. For example, the scheduling entity may include an L2 relay IAB node (e.g., a gNB or eNB) within an IAB network. In some examples, the process 900 may be carried out by any suitable apparatus or means for carrying out the functions or algorithm described below.

At block 902, the scheduling entity may communicate with a set of one or more scheduled entities (e.g., UEs and/or child IAB nodes) utilizing a first PCI associated with a cell served by the scheduling entity. For example, the resource assignment and scheduling circuitry 841 and communication and processing circuitry 842, together with the transceiver 810, shown and described above in connection with FIG. 8 may provide a means to communicate with the set of scheduled entities.

At 904, the scheduling entity may change from the first PCI to a second PCI to communicate with the set of one or more scheduled entities within the cell, where the first PCI corresponds to a first PSS waveform and the second PCI corresponds to a second PSS waveform different than the first PSS waveform. In some examples, the scheduling entity may receive a PCI change indication including the second PCI from a centralized network node (e.g., an IAB donor node central unit) in the IAB network to initiate the PCI change within the scheduling entity from the first PCI to the second PCI. The PCI change indication may be received in response to the IAB donor node detecting a PSS collision between the scheduling entity and a neighboring IAB node (e.g., between the first PSS waveform and a third PSS waveform transmitted by the neighboring IAB node, where the first PSS waveform and the third PSS waveform are identical). For example, the scheduling entity may be a first scheduling entity and the neighboring IAB node may be a second scheduling entity located proximate to the first scheduling entity. In this example, a first coverage area of the first scheduling entity may at least partially overlap a second coverage area of the second scheduling entity.

In some examples, the scheduling entity may detect a PSS collision with the second scheduling entity (e.g., between the first PSS waveform and the third PSS waveform) and may select the second PCI to avoid collision with the third PSS waveform. In some examples, the scheduling entity may detect the PSS collision as a result of detecting a collision between the first PCI and a third PCI utilized by the second scheduling entity. Here, the first and third PCIs may be identical. The scheduling entity may then transmit a message including a PCI change notification with the second PCI to the TAB donor node upon changing to the second PCI.

In some examples, the scheduling entity may detect a PSS collision with the second scheduling entity (e.g., between the first PSS waveform and the third PSS waveform) and may transmit a PCI change request to the TAB donor node, requesting the second PCI. The scheduling entity may then receive the PCI change indication including the second PCI from the TAB donor node. For example, the PCI change management circuitry 844 shown and described above in connection with FIG. 8 may provide a means to change from the first PCI to the second PCI.

Figure 10:
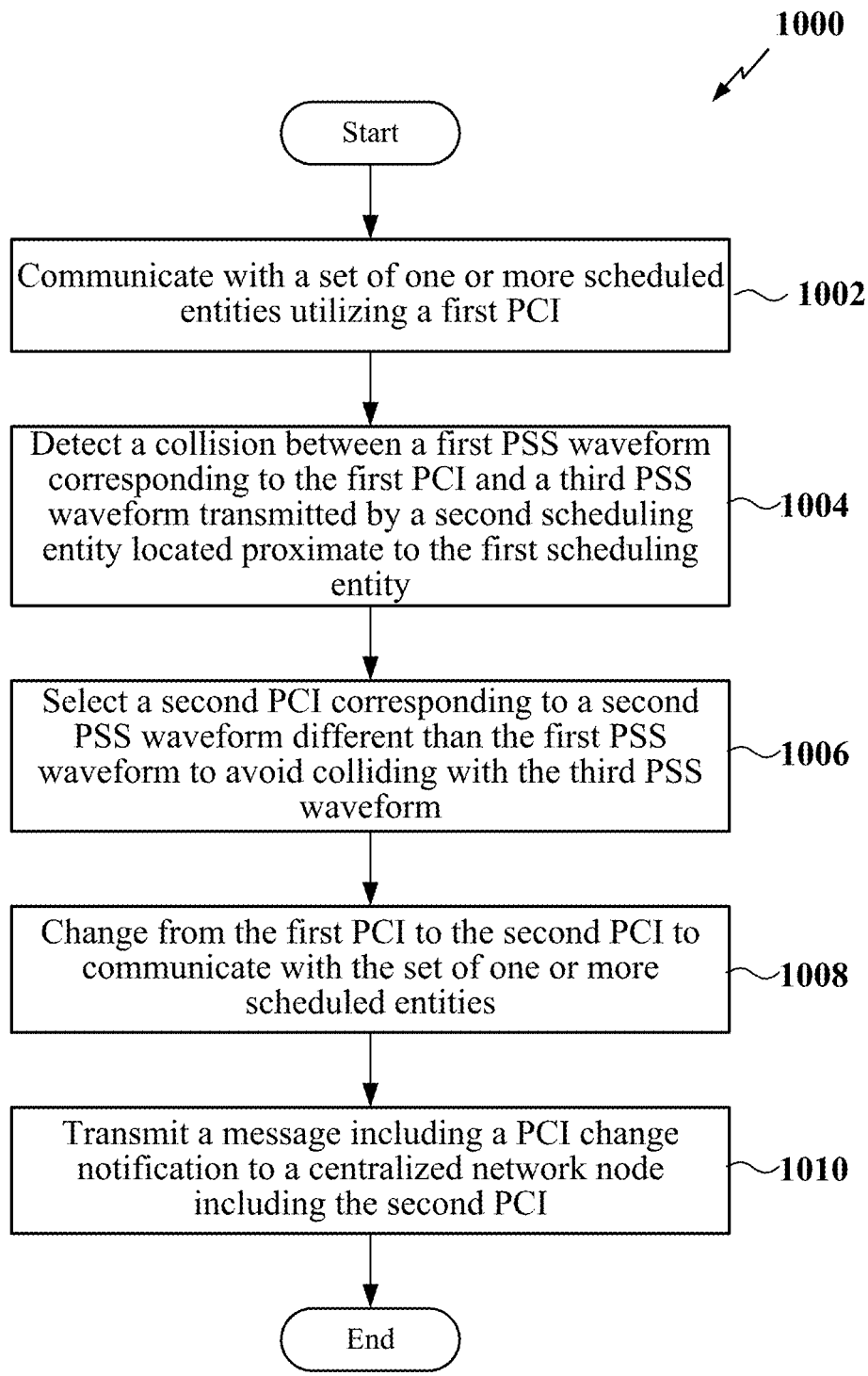
FIG. 10 is a flow chart illustrating an exemplary process for a scheduling entity to perform a PCI change based on a PSS waveform according to some aspects.

FIG. 10 is a flow chart illustrating another exemplary process 1000 for performing a PCI change based on a PSS waveform at a scheduling entity according to some aspects of the disclosure. As described below, some or all illustrated features may be omitted in a particular implementation within the scope of the present disclosure, and some illustrated features may not be required for implementation of all embodiments. In some examples, the process 1000 may be carried out by the scheduling entity illustrated in FIG. 8. For example, the scheduling entity may include an L2 relay TAB node (e.g., a gNB or eNB) within an TAB network. In some examples, the process 1000 may be carried out by any suitable apparatus or means for carrying out the functions or algorithm described below.

At block 1002, the scheduling entity (e.g., a first scheduling entity) may communicate with a set of one or more scheduled entities (e.g., UEs and/or child IAB nodes) utilizing a first PCI associated with a cell served by the scheduling entity. For example, the resource assignment and scheduling circuitry 841 and communication and processing circuitry 842, together with the transceiver 810, shown and described above in connection with FIG. 8 may provide a means to communicate with the set of scheduled entities.

At block 1004, the first scheduling entity may detect a collision between a first PSS waveform corresponding to the first PCI and a third PSS waveform transmitted by a second scheduling entity located proximate to the first scheduling entity. In this example, a first coverage area of the first scheduling entity may at least partially overlap a second coverage area of the second scheduling entity. In some examples, the first scheduling entity may detect a collision between the first PCI and a third PCI utilized by the second scheduling entity. In this example, the first PCI and the third PCI may be identical and the collision between the first PCI and the third PCI produces the collision between the first PSS waveform and the third PSS waveform. For example, the PSS collision detection circuitry 843 shown and described above in connection with FIG. 8 may provide a means for detecting the collision between the first PSS waveform and the third PSS waveform.

At block 1006, the first scheduling entity may select a second PCI corresponding to a second PSS waveform different than the first PSS waveform to avoid colliding with the third PSS waveform. For example, the PCI change management circuitry 844 shown and described above in connection with FIG. 8 may provide a means to select the second PCI.

At block 1008, the first scheduling entity may change from the first PCI to the second PCI to communicate with the set of one or more scheduled entities within the cell. For example, the PCI change management circuitry 844 shown and described above in connection with FIG. 8 may provide a means to change from the first PCI to the second PCI.

At block 1010, the first scheduling entity may then transmit a message including a PCI change notification with the second PCI to an IAB donor node upon changing to the second PCI. For example, the PCI change management circuitry 844, together with the communication and processing circuitry 842, resource assignment and scheduling circuitry 841, and transceiver 810, shown and described above in connection with FIG. 8 may provide a means to transmit the PCI change notification to the TAB donor node.

Figure 11:
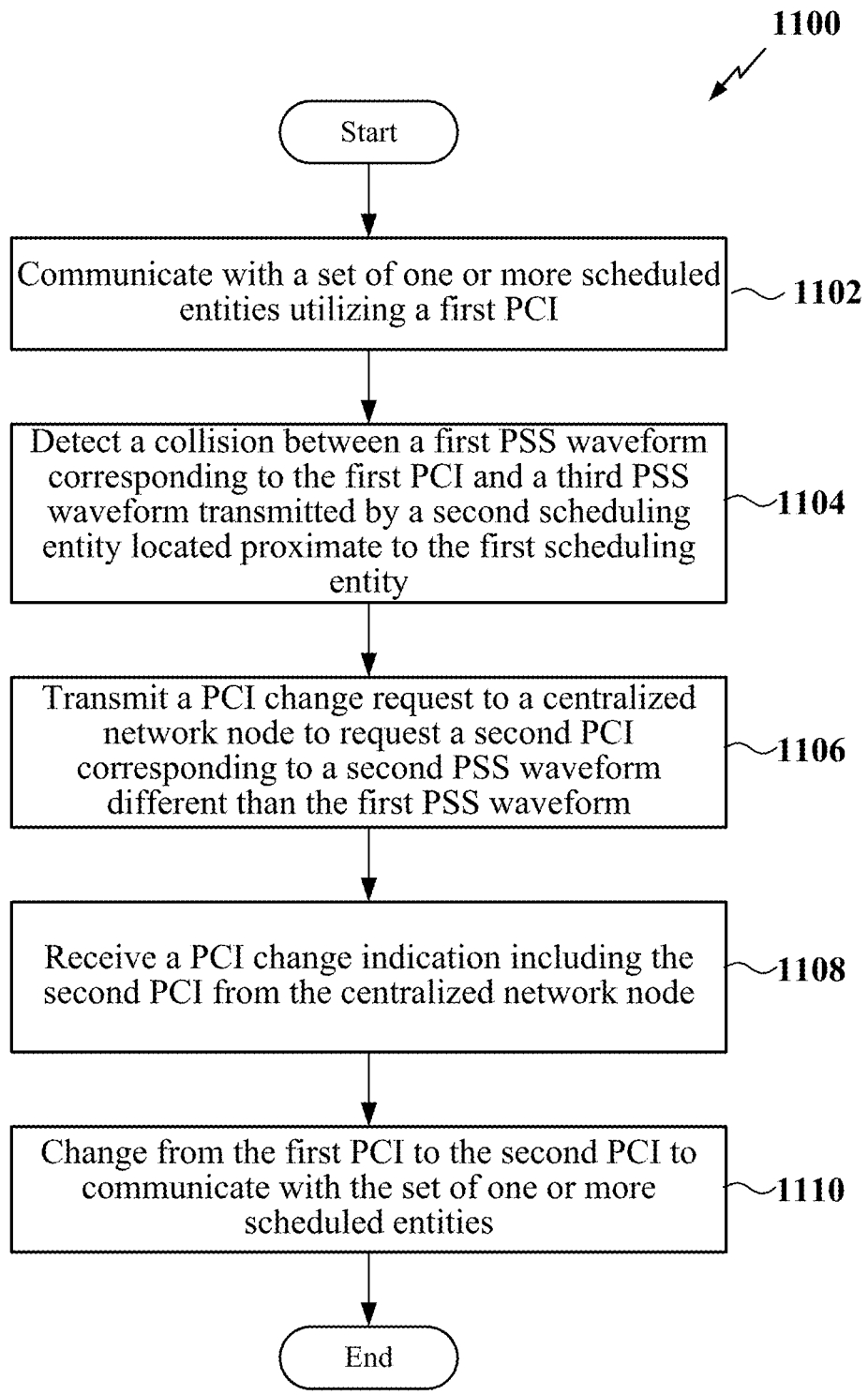
FIG. 11 is a flow chart illustrating another exemplary process for a scheduling entity to perform a PCI change based on a PSS waveform according to some aspects.

FIG. 11 is a flow chart illustrating another exemplary process 1100 for performing a PCI change based on a PSS waveform at a scheduling entity according to some aspects of the disclosure. As described below, some or all illustrated features may be omitted in a particular implementation within the scope of the present disclosure, and some illustrated features may not be required for implementation of all embodiments. In some examples, the process 1100 may be carried out by the scheduling entity illustrated in FIG. 8. For example, the scheduling entity may include an L2 relay TAB node (e.g., a gNB or eNB) within an TAB network. In some examples, the process 1100 may be carried out by any suitable apparatus or means for carrying out the functions or algorithm described below.

At block 1102, the scheduling entity (e.g., a first scheduling entity) may communicate with a set of one or more scheduled entities (e.g., UEs and/or child TAB nodes) utilizing a first PCI associated with a cell served by the scheduling entity. For example, the resource assignment and scheduling circuitry 841 and communication and processing circuitry 842, together with the transceiver 810, shown and described above in connection with FIG. 8 may provide a means to communicate with the set of scheduled entities.

At block 1104, the first scheduling entity may detect a collision between a first PSS waveform corresponding to the first PCI and a third PSS waveform transmitted by a second scheduling entity located proximate to the first scheduling entity. In this example, a first coverage area of the first scheduling entity may at least partially overlap a second coverage area of the second scheduling entity. In some examples, the first scheduling entity may detect a collision between the first PCI and a third PCI utilized by the second scheduling entity. In this example, the first PCI and the third PCI may be identical and the collision between the first PCI and the third PCI produces the collision between the first PSS waveform and the third PSS waveform. For example, the PSS collision detection circuitry 843 shown and described above in connection with FIG. 8 may provide a means for detecting the collision between the first PSS waveform and the third PSS waveform.

At block 1106, the first scheduling entity may transmit a PCI change request to a centralized network node (e.g., TAB donor node) to request a second PCI corresponding to a second PSS waveform different than the first PSS waveform. For example, the PCI change management circuitry 844, together with the communication and processing circuitry 842, resource assignment and scheduling circuitry 841, and transceiver 810, shown and described above in connection with FIG. 8 may provide a means to transmit the PCI change request.

At block 1108, the first scheduling entity may receive a PCI change indication including the second PCI from the centralized network node. For example, the PCI change management circuitry 844, together with the communication and processing circuitry 842 and transceiver 810, shown and described above in connection with FIG. 8 may provide a means for receiving the PCI change indication.

At block 1110, the first scheduling entity may change from the first PCI to the second PCI to communicate with the set of one or more scheduled entities within the cell. For example, the PCI change management circuitry 844 shown and described above in connection with FIG. 8 may provide a means to change from the first PCI to the second PCI.

Figure 12:
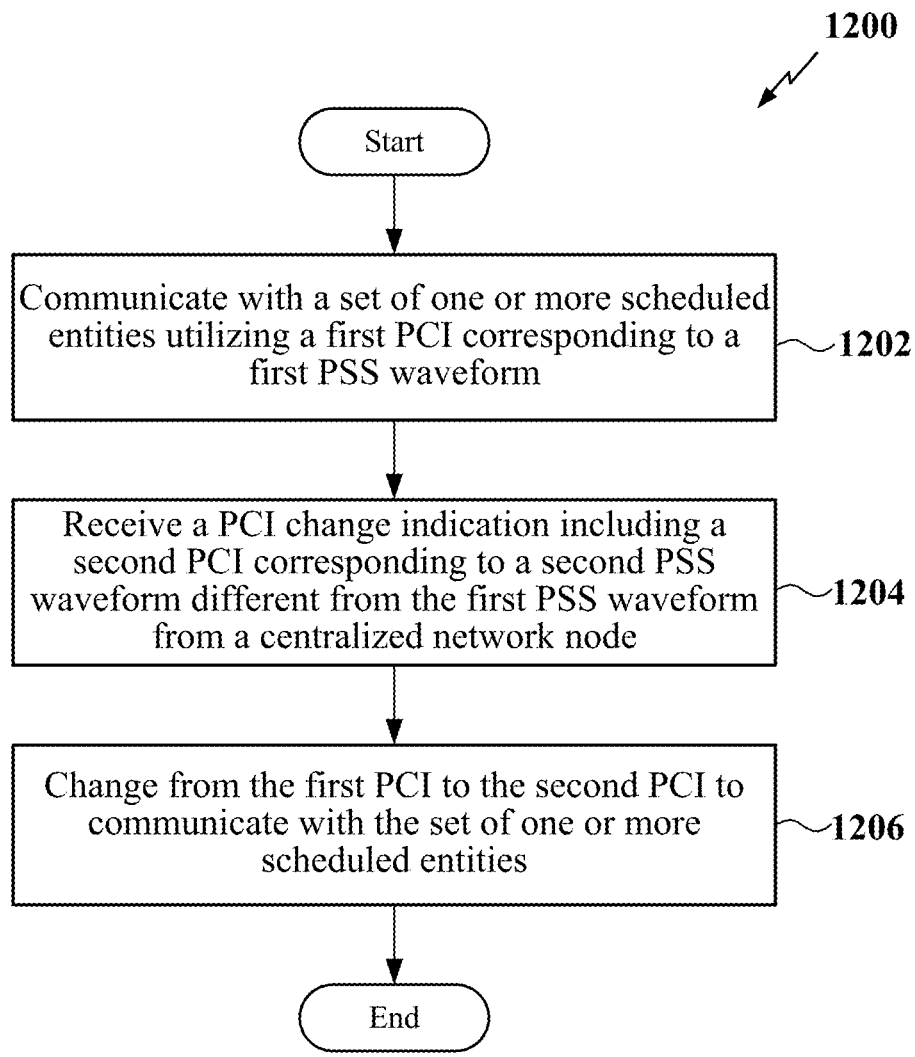
FIG. 12 is a flow chart illustrating another exemplary process for a scheduling entity to perform a PCI change based on a PSS waveform according to some aspects.

FIG. 12 is a flow chart illustrating another exemplary process 1200 for performing a PCI change based on a PSS waveform at a scheduling entity according to some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduling entity illustrated in FIG. 8. For example, the scheduling entity may include an L2 relay TAB node (e.g., a gNB or eNB) within an TAB network. In some examples, the process 1200 may be carried out by any suitable apparatus or means for carrying out the functions or algorithm described below.

At block 1202, the scheduling entity (e.g., a first scheduling entity) may communicate with a set of one or more scheduled entities (e.g., UEs and/or child TAB nodes) utilizing a first PCI associated with a cell served by the scheduling entity. The first PCI may correspond to a first PSS waveform. For example, the resource assignment and scheduling circuitry 841 and communication and processing circuitry 842, together with the transceiver 810, shown and described above in connection with FIG. 8 may provide a means to communicate with the set of scheduled entities.

At block 1204, the first scheduling entity may receive a PCI change indication including a second PCI corresponding to a second PSS waveform different from the first PSS waveform from a centralized network node. For example, the PCI change management circuitry 844, together with the communication and processing circuitry 842 and transceiver 810, shown and described above in connection with FIG. 8 may provide a means for receiving the PCI change indication.

At block 1206, the first scheduling entity may change from the first PCI to the second PCI to communicate with the set of one or more scheduled entities within the cell. For example, the PCI change management circuitry 844 shown and described above in connection with FIG. 8 may provide a means to change from the first PCI to the second PCI.

In one configuration, the scheduling entity 800 includes means for performing the various functions and processes described in relation to FIGS. 9-12. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, and/or 4-7, and utilizing, for example, the processes and/or algorithms described herein in relation to FIGS. 9-12.

Figure 13:
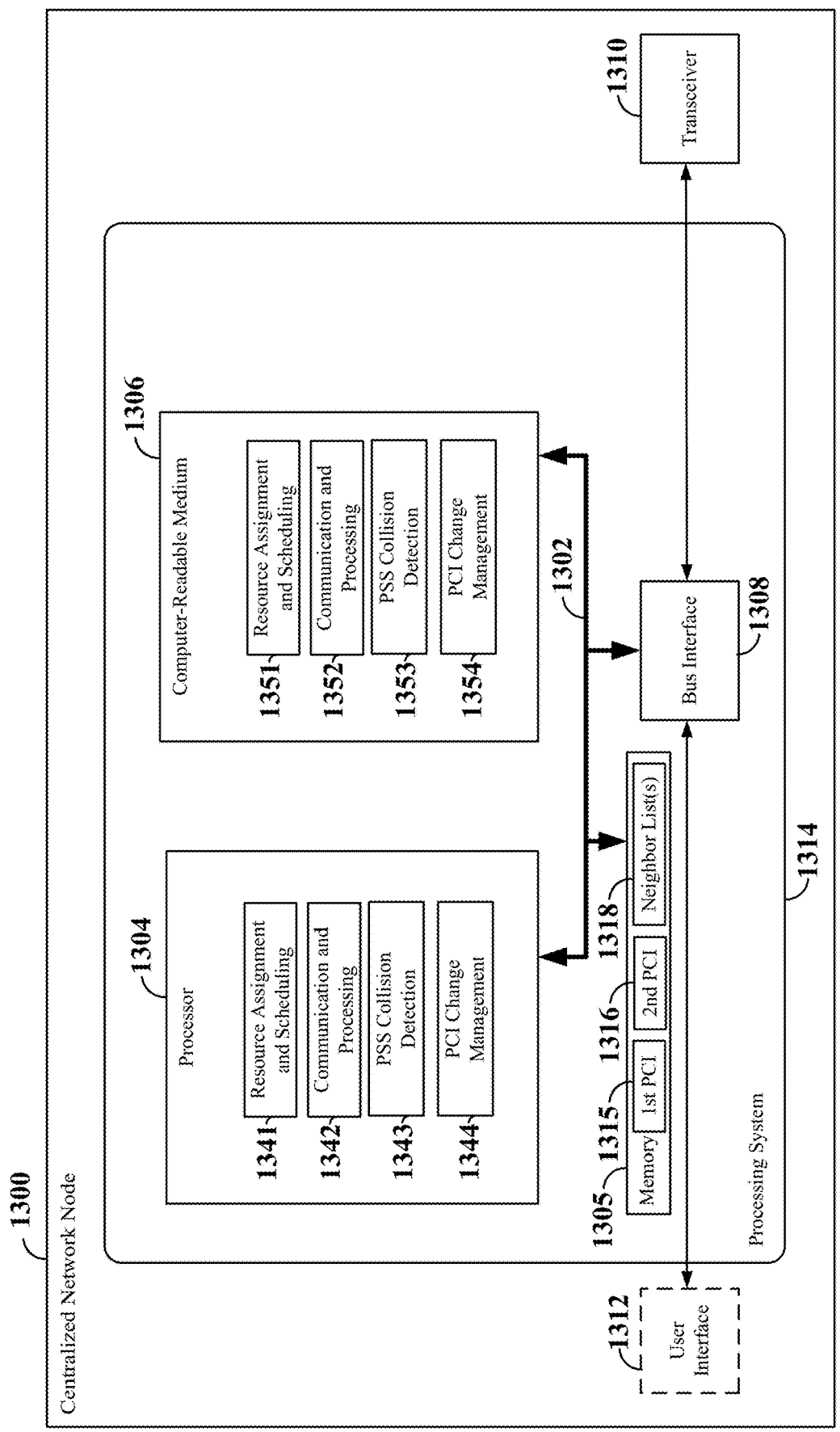
FIG. 13 is a flow chart illustrating another exemplary process for a scheduling entity to perform a PCI change based on a PSS waveform according to some aspects.

FIG. 13 is a conceptual diagram illustrating an example of a hardware implementation for an exemplary centralized network node 1300 employing a processing system 1314. For example, the centralized network node 1300 may be, for example, a base station (e.g., eNB, gNB), IAB donor node (e.g., CU of an IAB donor node), or any other centralized network node illustrated in any one or more of FIGS. 1, 2, and/or 4-7.

In accordance with various aspects of the disclosure, an element, or any portion of an element, or any combination of elements may be implemented with a processing system 1314 that includes one or more processors 1304. The processing system 1314 may be substantially the same as the processing system 814 illustrated in FIG. 8, including a bus interface 1308, a bus 1302, memory 1305, a processor 1304, and a computer-readable medium 1306. Furthermore, the centralized network node 1300 may include an optional user interface 1312 and a transceiver 1310 substantially similar to those described above in FIG. 8. That is, the processor 1304, as utilized in a centralized network node 1300, may be used to implement any one or more of the processes described below.

In some aspects of the disclosure, the processor 1304 may include circuitry configured for various functions. For example, the processor 1304 may include resource assignment and scheduling circuitry 1341, configured to, for example, schedule transmission of a message (e.g., RRC signal) including a PCI change indication to initiate a change from a first PCI 1315 to a second PCI 1316 at an L2 relay IAB node (e.g., a child IAB node) within the IAB network. The first PCI 1315 and second PCI 1316 may be stored, for example, in memory 1305. The resource assignment and scheduling circuitry 1341 may further be configured to execute resource assignment and scheduling software 1351 included on the computer-readable medium 1306 to implement one or more functions described herein.

The processor 1304 may further include communication and processing circuitry 1342, configured to communicate with a set of one or more scheduled entities (e.g., UEs or child IAB nodes). In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). In examples in which the centralized network node, such as an IAB donor node, initiates the PCI change at an L2 relay IAB node (e.g., a child IAB node communicatively coupled to the IAB donor node through one or more backhaul links), the communication and processing circuitry 1342 may be configured to generate and transmit, via the transceiver 1310, the message (e.g., RRC signal) to the L2 relay IAB node in the IAB network including the PCI change indication to initiate the PCI change from the first PCI 1315 to the second PCI 1316 within the L2 relay IAB node. The communication and processing circuitry 1342 may further be configured to execute communication and processing software 1352 included on the computer-readable medium 1306 to implement one or more functions described herein.

The processor 1304 may further include PSS collision detection circuitry 1343, configured to detect a PSS collision between two neighboring IAB nodes. For example, the PSS collision detection circuitry 1343 may be configured to detect the PSS collision through topology adaptation procedures performed as a result of a mobile IAB node, neighbor list 1318 updates (e.g., which may be stored, for example, in memory 1305) provided by L2 relay IAB nodes, and/or information provided by other network nodes (e.g., child IAB nodes and/or UEs). In some examples, the PSS collision may result from a PCI collision between the neighboring IAB nodes. In other examples, the PSS collision may result from different PCIs between the neighboring IAB nodes producing the same PSS waveform. The PSS collision detection circuitry 1343 may further be configured to execute PSS collision detection software 1353 included on the computer-readable medium 1306 to implement one or more functions described herein.

The processor 1304 may further include PCI change management circuitry 1344, configured to perform a PCI change from the first PCI 1315 to the second PCI 1316. For example, the PCI change management circuitry 1344 may be configured to receive an indication of a PSS collision involving a child IAB node (e.g., an L2 relay IAB node communicatively coupled to the IAB donor node through one or more backhaul links) from the PSS collision detection circuitry 1343. The PCI change management circuitry 1344 may further be configured to select the second PCI 1316 for the child IAB node and initiate a PCI change within the child IAB node from the first PCI 1315 to the second PCI 1316. For example, the PCI change management circuitry 1344 may be configured to operate together with the communication and processing circuitry 1342 and transceiver 1310 to generate and transmit the message including the PCI change indication with the second PCI 1316 to the child IAB node experiencing the PSS collision.

In examples in which the child IAB node autonomously detects the PSS collision, the PCI change management circuitry 1344 may be configured to receive an indication of the PSS collision from the child IAB node. For example, the PCI change management circuitry 1344 may be configured to receive a PCI change request from the child IAB node. The PCI change management circuitry 1344 may then be configured to select the second PCI 1316 for the child IAB node and generate and transmit a message including a PCI change indication with the second PCI 1316 to the child IAB node experiencing the PSS collision.

In examples in which the child IAB node both autonomously detects the PSS collision and selects a new PCI (e.g., the second PCI 1316) for the child IAB node, the PCI change management circuitry 1344 may be configured to receive a PCI change notification including the second PCI 1316 from the scheduled entity and to update one or more neighbor lists(s) 1318 with the second PCI 1316. The neighbor list(s) 1318 may be stored, for example, in memory 1305, and may be provided to one or more IAB nodes within the IAB network via, for example, the communication and processing circuitry 1342 and transceiver 1310. The PCI change management circuitry 1344 may further be configured to execute PCI change management software 1354 included on the computer-readable medium 1306 to implement one or more functions described herein.

Figure 14:
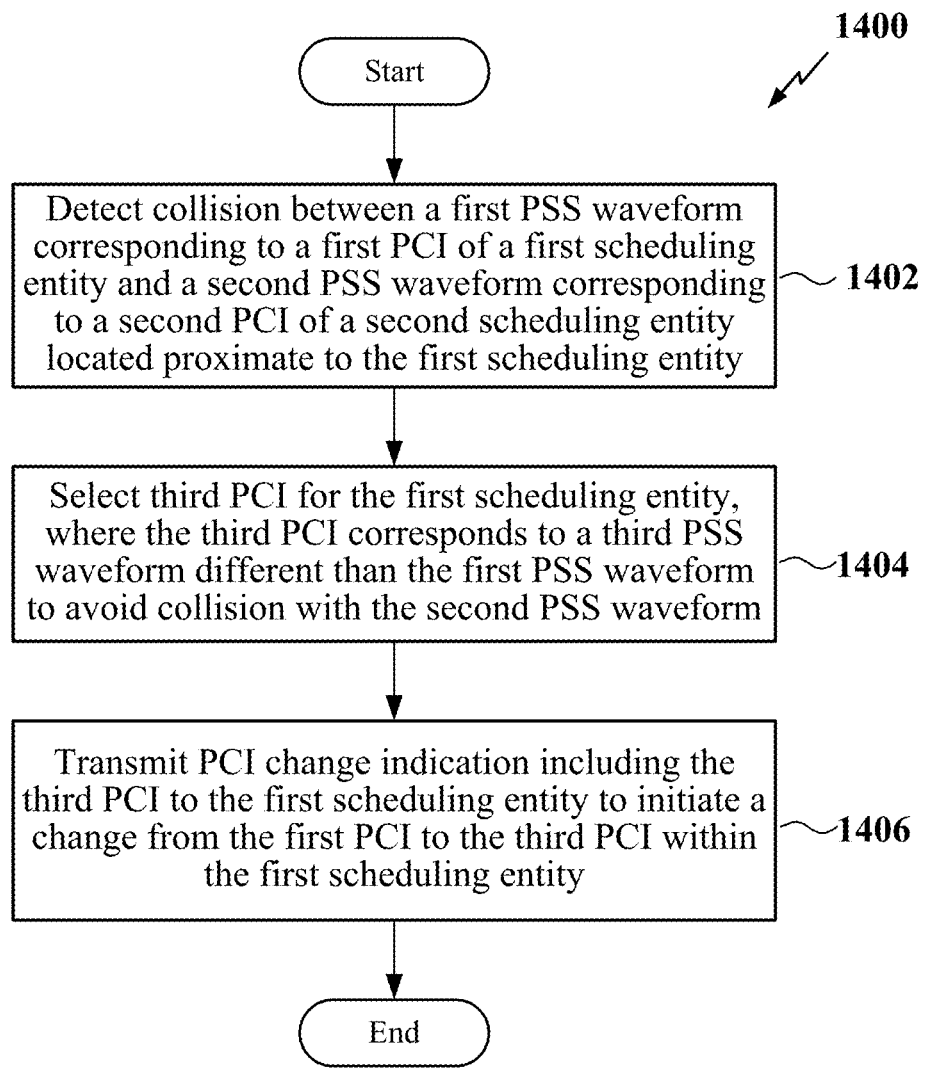
FIG. 14 is a flow chart illustrating an exemplary process for a centralized network node to select a PCI for a scheduling entity based on a PSS waveform according to some aspects.

FIG. 14 is a flow chart illustrating an exemplary process 1400 for performing a PCI change based on a PSS waveform at a centralized network node according to some aspects of the disclosure. As described below, some or all illustrated features may be omitted in a particular implementation within the scope of the present disclosure, and some illustrated features may not be required for implementation of all embodiments. In some examples, the process 1400 may be carried out by the centralized network node illustrated in FIG. 13. For example, the centralized network node may include an IAB donor node (e.g., IAB-CU) or other central entity within an IAB network. In some examples, the process 1400 may be carried out by any suitable apparatus or means for carrying out the functions or algorithm described below.

At block 1402, the centralized network node may detect a collision between a first PSS corresponding to a first PCI assigned to a first scheduling entity and a second PSS waveform corresponding to a second PCI assigned to a second scheduling entity located proximate to the first scheduling entity. Here, a first coverage area of the first scheduling entity and a second coverage area of the second scheduling entity may at least partially overlap. For example, the first and second scheduling entities may be L2 relay IAB nodes within an IAB network. In some examples, the first PSS waveform and the second PSS waveform are identical. In some examples, the centralized network node may further detect a collision between the first PCI and the second PCI (e.g., the first and second PCI are identical), where the PCI collision produces the PSS collision. For example, the PSS collision detection circuitry 1343 shown and described above in connection with FIG. 13 may provide a means to detect the PSS collision.

At block 1404, the centralized network node may select a third PCI for the first scheduling entity, where the third PCI corresponds to a third PSS waveform different than the first PSS waveform to avoid collision with the second PSS waveform. For example, the PCI change management circuitry 1344 shown and described above in connection with FIG. 13 may provide a means to select the third PCI for the first scheduling entity.

At block 1406, the centralized network node may transmit a PCI change indication including the third PCI to the first scheduling entity to initiate the PCI change within the first scheduling entity from the first PCI to the third PCI. For example, the PCI change management circuitry 1344, together with the communication and processing circuitry 1342 and transceiver 1310, shown and described above in connection with FIG. 13 may provide a means to transmit the PCI change indication to the first scheduling entity.

In one configuration, the centralized network node 1300 includes means for performing the various functions and processes described in relation to FIG. 14. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, and/or 4-7, and utilizing, for example, the processes and/or algorithms described herein in relation to FIG. 14.

The following provides an overview of examples of the present disclosure.

Example 1: A method of wireless communication at a first scheduling entity, comprising: communicating with a set of one or more scheduled entities utilizing a first physical cell identifier (PCI); and changing from the first PCI to a second PCI to communicate with the set of one or more scheduled entities; wherein the first PCI corresponds to a first primary synchronization signal (PSS) waveform and the second PCI corresponds to a second PSS waveform different than the first PSS waveform.

Example 2: The method of example 1, further comprising: detecting a collision between the first PSS waveform and a third PSS waveform transmitted by a second scheduling entity located proximate to the first scheduling entity; and selecting the second PCI to avoid colliding with the third PSS waveform.

Example 3: The method of example 1 or 2, wherein a first coverage area of the first scheduling entity and a second coverage area of the second scheduling entity at least partially overlap.

Example 4: The method of any of examples 1 through 3, wherein the first PSS waveform and the third PSS waveform are identical.

Example 5: The method of any of examples 1 through 4, further comprising: detecting a collision between the first PCI and a third PCI utilized by the second scheduling entity, wherein the first PCI and the third PCI are identical, wherein the collision between the first PCI and the third PCI produces the collision between the first PSS waveform and the third PSS waveform.

Example 6: The method of any of examples 1 through 5, further comprising: transmitting a message comprising a PCI change notification to a centralized network node upon changing to the second PCI, wherein the PCI change notification comprises the second PCI.

Example 7: The method of any of examples 1 through 6, wherein the first scheduling entity comprises a first integrated-access-backhaul (IAB) node distributed unit and the centralized network node comprises an IAB donor node central unit.

Example 8: The method of example 1, further comprising: receiving a PCI change indication comprising the second PCI from a centralized network node.

Example 9: The method of example 1 or 8, further comprising: transmitting a PCI change request to the centralized network node, requesting the second PCI.

Example 10: The method of any of examples 1 through 9, wherein the first scheduling entity comprises a first integrated-access-backhaul (IAB) node and the centralized network node comprises an IAB donor node central unit.

Example 11: A first scheduling entity in a wireless communication network comprising a transceiver, a memory, and a processor communicatively coupled to the transceiver and the memory, the processor and memory configured to perform a method of any one of examples 1 through 10.

Example 12: A method of wireless communication at a centralized network node, comprising: detecting a collision between a first primary synchronization signal (PSS) waveform corresponding to a first physical cell identifier (PCI) assigned to a first scheduling entity and a second PSS waveform corresponding to a second PCI assigned to a second scheduling entity located proximate to the first scheduling entity; selecting a third PCI for the first scheduling entity, wherein the third PCI corresponds to a third PSS waveform different than the first PSS waveform to avoid colliding with the second PSS waveform; and transmitting a PCI change indication comprising the third PCI to the first scheduling entity to initiate a change from the first PCI to the third PCI within the first scheduling entity.

Example 13: The method of example 12, wherein a first coverage area of the first scheduling entity and a second coverage area of the second scheduling entity at least partially overlap.

Example 14: The method of example 12 or 13, wherein the first PSS waveform and the second PSS waveform are identical.

Example 15: The method of any of examples 12 through 14, further comprising: detecting a collision between the first PCI and the second PCI, wherein the first PCI and the second PCI are identical, wherein the collision between the first PCI and the second PCI produces the collision between the first PSS waveform and the second PSS waveform.

Example 16: The method of any of examples 12 through 15, wherein the first scheduling entity comprises a first integrated-access-backhaul (IAB) node, the second scheduling entity comprises a second IAB node and the centralized network node comprises an IAB donor node central unit.

Example 17: A centralized network node in a wireless communication network comprising a transceiver, a memory, and a processor communicatively coupled to the transceiver and the memory, the processor and memory configured to perform a method of any one of examples 12 through 16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-8, and 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a first scheduling entity, comprising:
    communicating with a set of one or more scheduled entities utilizing a first physical cell identifier (PCI); and
    changing from the first PCI corresponding to a first primary synchronization signal (PSS) waveform to a second PCI corresponding to a second PSS waveform different than the first PSS waveform to communicate with the set of one or more scheduled entities.

2. The method of claim 1, further comprising:
    detecting a collision between the first PSS waveform and a third PSS waveform transmitted by a second scheduling entity located proximate to the first scheduling entity; and
    selecting the second PCI to avoid colliding with the third PSS waveform.

3. The method of claim 2, wherein a first coverage area of the first scheduling entity and a second coverage area of the second scheduling entity at least partially overlap.

4. The method of claim 2, wherein the first PSS waveform and the third PSS waveform are identical.

5. The method of claim 2, further comprising:
    detecting a collision between the first PCI and a third PCI utilized by the second scheduling entity, wherein the first PCI and the third PCI are identical, wherein the collision between the first PCI and the third PCI produces the collision between the first PSS waveform and the third PSS waveform.

6. The method of claim 2, further comprising:
    transmitting a message comprising a PCI change notification to a centralized network node upon changing to the second PCI, wherein the PCI change notification comprises the second PCI.

7. The method of claim 6, wherein the first scheduling entity comprises a first integrated-access-backhaul (IAB) node distributed unit and the centralized network node comprises an IAB donor node central unit.

8. The method of claim 1, further comprising:
    receiving a PCI change indication comprising the second PCI from a centralized network node.

9. The method of claim 8, further comprising:
    transmitting a PCI change request to the centralized network node, requesting the second PCI.

10. The method of claim 8, wherein the first scheduling entity comprises a first integrated-access-backhaul (IAB) node and the centralized network node comprises an IAB donor node central unit.

11. A first scheduling entity within a wireless communication network, comprising:
    a transceiver configured to communicate with a set of one or more scheduled entities in the wireless communication network;
    a memory; and
    a processor communicatively coupled to the transceiver and the memory, the processor and the memory configured to:
        communicate with the set of one or more scheduled entities utilizing a first physical cell identifier (PCI) via the transceiver; and
        change from the first PCI corresponding to a first primary synchronization signal (PSS) waveform to a second PCI corresponding to a second PSS waveform different than the first PSS waveform to communicate with the set of one or more scheduled entities.

12. The first scheduling entity of claim 11, wherein the processor and the memory are further configured to:
detect a collision between the first PSS waveform and a third PSS waveform transmitted by a second scheduling entity located proximate to the first scheduling entity; and
select the second PCI to avoid colliding with the third PSS waveform.

13. The first scheduling entity of claim 12, wherein a first coverage area of the first scheduling entity and a second coverage area of the second scheduling entity at least partially overlap.

14. The first scheduling entity of claim 12, wherein the first PSS waveform and the third PSS waveform are identical.

15. The first scheduling entity of claim 12, wherein the processor and the memory are further configured to:
detect a collision between the first PCI and a third PCI utilized by the second scheduling entity, wherein the first PCI and the third PCI are identical, wherein the collision between the first PCI and the third PCI produces the collision between the first PSS waveform and the third PSS waveform.

16. The first scheduling entity of claim 12, wherein the processor and the memory are further configured to:
transmit a message comprising a PCI change notification to a centralized network node upon changing to the second PCI, wherein the PCI change notification comprises the second PCI.

17. The first scheduling entity of claim 16, wherein the first scheduling entity comprises a first integrated-access-backhaul (IAB) node distributed unit and the centralized network node comprises an IAB donor node central unit.

18. The first scheduling entity of claim 11, wherein the processor and the memory are further configured to:
receive a PCI change indication comprising the second PCI from a centralized network node.

19. The first scheduling entity of claim 18, wherein the processor and the memory are further configured to:
transmit a PCI change request to the centralized network node, requesting the second PCI.

20. The first scheduling entity of claim 18, wherein the first scheduling entity comprises a first integrated-access-backhaul (IAB) node and the centralized network node comprises an IAB donor node central unit.

21. A method of wireless communication at a centralized network node, comprising:
detecting a collision between a first primary synchronization signal (PSS) waveform corresponding to a first physical cell identifier (PCI) assigned to a first scheduling entity and a second PSS waveform corresponding to a second PCI assigned to a second scheduling entity located proximate to the first scheduling entity;
selecting a third PCI for the first scheduling entity, wherein the third PCI corresponds to a third PSS waveform different than the first PSS waveform to avoid colliding with the second PSS waveform; and
transmitting a PCI change indication comprising the third PCI to the first scheduling entity to initiate a change from the first PCI to the third PCI within the first scheduling entity.

22. The method of claim 21, wherein a first coverage area of the first scheduling entity and a second coverage area of the second scheduling entity at least partially overlap.

23. The method of claim 21, wherein the first PSS waveform and the second PSS waveform are identical.

24. The method of claim 21, further comprising:
detecting a collision between the first PCI and the second PCI, wherein the first PCI and the second PCI are identical, wherein the collision between the first PCI and the second PCI produces the collision between the first PSS waveform and the second PSS waveform.

25. The method of claim 21, wherein the first scheduling entity comprises a first integrated-access-backhaul (IAB) node, the second scheduling entity comprises a second IAB node and the centralized network node comprises an IAB donor node central unit.

26. A centralized network node within a wireless communication network, comprising:
a transceiver;
a memory; and
a processor communicatively coupled to the transceiver and the memory, the processor and the memory configured to:
detect a collision between a first primary synchronization signal (PSS) waveform corresponding to a first physical cell identifier (PCI) assigned to a first scheduling entity and a second PSS waveform corresponding to a second PCI assigned to a second scheduling entity located proximate to the first scheduling entity;
select a third PCI for the first scheduling entity, wherein the third PCI corresponds to a third PSS waveform different than the first PSS waveform to avoid colliding with the second PSS waveform; and
transmit a PCI change indication comprising the third PCI to the first scheduling entity to initiate a change from the first PCI to the third PCI within the first scheduling entity.

27. The centralized network node of claim 26, wherein a first coverage area of the first scheduling entity and a second coverage area of the second scheduling entity at least partially overlap.

28. The centralized network node of claim 26, wherein the first PSS waveform and the second PSS waveform are identical.

29. The centralized network node of claim 26, wherein the processor and the memory are further configured to:
detect a collision between the first PCI and the second PCI, wherein the first PCI and the second PCI are identical, wherein the collision between the first PCI and the second PCI produces the collision between the first PSS waveform and the second PSS waveform.

30. The centralized network node of claim 26, wherein the first scheduling entity comprises a first integrated-access-backhaul (IAB) node, the second scheduling entity comprises a second IAB node and the centralized network node comprises an IAB donor node central unit.

* * * * *